(12) United States Patent
Knas

(10) Patent No.: US 10,825,330 B1
(45) Date of Patent: Nov. 3, 2020

(54) NOTIFICATION SYSTEM FOR MOBILE DEVICES

(71) Applicant: MASSACHUSETTS MUTUAL LIFE INSURANCE COMPANY, Springfield, MA (US)

(72) Inventor: Michal Knas, Monson, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 16/273,968

(22) Filed: Feb. 12, 2019

Related U.S. Application Data

(63) Continuation of application No. 15/840,859, filed on Dec. 13, 2017, now Pat. No. 10,242,555, which is a continuation of application No. 15/371,003, filed on Dec. 6, 2016, now Pat. No. 9,875,645.

(60) Provisional application No. 62/264,612, filed on Dec. 8, 2015.

(51) Int. Cl.
*G08B 25/10* (2006.01)
*G08B 7/06* (2006.01)

(52) U.S. Cl.
CPC .............. *G08B 25/10* (2013.01); *G08B 7/06* (2013.01)

(58) Field of Classification Search
CPC ........ G08B 25/10; G08B 13/00; G08B 17/06; G08B 21/0261; G08B 21/0277; G08B 21/187; G08B 25/005; G08B 25/006; G08B 25/016; G08B 27/006; G08B 6/00; G08B 7/06
See application file for complete search history.

(56) References Cited

U.S. PATENT DOCUMENTS

| | | | |
|---|---|---|---|
| 7,671,732 B1 | 3/2010 | Sennett et al. | |
| 9,299,241 B1* | 3/2016 | Monical | H04W 4/029 |
| 9,875,645 B1 | 1/2018 | Knas | |
| 2010/0136950 A1 | 6/2010 | Backlund et al. | |
| 2012/0002791 A1 | 1/2012 | Kraus et al. | |
| 2013/0183924 A1* | 7/2013 | Saigh | A61K 9/0063 |
| | | | 455/404.2 |
| 2014/0253326 A1 | 9/2014 | Cho et al. | |
| 2015/0022355 A1 | 1/2015 | Pham et al. | |
| 2016/0105847 A1* | 4/2016 | Smith | H04L 67/125 |
| | | | 370/252 |

\* cited by examiner

*Primary Examiner* — Thomas S McCormack
(74) *Attorney, Agent, or Firm* — Foley & Lardner LLP

(57) ABSTRACT

A method for sensory alert notification comprises retrieving an uncharacterized event record associated with a first user and a second user. The method comprises characterizing the uncharacterized event record by assigning a value to the uncharacterized event record based on an event impact value that characterizes an impact of the uncharacterized event record, a first user identifier, and a second user identifier. The method comprises generating a notification record comprising the characterized event record and a notification urgency value and generating a sensory alert notification, comprising one or more of a repeat and intensity rate of vibrating pulses, a repeat and a pitch rate of beeps of sound, and a repeat rate and a color of blinks of light, based on the notification record. The method further comprises transmitting the sensory alert notification to a mobile computing device of the second user.

20 Claims, 18 Drawing Sheets

1600

| | AUDIBLE | VIBRATION | VISUAL |
|---|---|---|---|
| URGENT NEGATIVE | RAPID INTERVAL HIGH PITCH SOUND, (2 PER SECOND) | RAPID AND HIGH INTENSITY, (2 PER SECOND) | RAPID RED BLINKING LIGHT, (2 PER SECOND) |
| NEGATIVE | HIGH PITCH SOUND, (1 PER SECOND) | HIGH INTENSITY, (1 PER SECOND) | RED BLINKING LIGHT, (1 PER SECOND) |
| URGENT POSITIVE | RAPID INTERVAL LOW PITCH SOUND, (2 PER SECOND) | RAPID AND LOW INTENSITY, (2 PER SECOND) | RAPID GREEN BLINKING LIGHT, (2 PER SECOND) |
| POSITIVE | LOW PITCH SOUND, (1 PER SECOND) | LOW INTENSITY, (1 PER SECOND) | GREEN BLINKING LIGHT, (1 PER SECOND) |

| TEXT STRING | RESPONSE DATA TYPE | INPUT CONTROL TYPE | BUTTON TYPE |
|---|---|---|---|
| NEW BUSINESS SUCCESSFULLY SUBMITTED | NULL | NONE | OK |
| CASE 9991 HAS ENTERED UNDERWRITING | NULL | NONE | OK |
| PLEASE PROVIDE D.O.B. FOR CASE 9991 | DATETIME | TEXTBOX | SUBMIT |
| PLEASE CALL UNDERWRITER PROBLEM WITH CASE 9991 | NULL | NONE | OK |

FIG. 17

NOTIFICATION SYSTEM FOR MOBILE DEVICES

CROSS-REFERENCE TO RELATED APPLICATIONS

This patent application is a continuation application of U.S. patent application Ser. No. 15/840,859, filed Dec. 13, 2017, which is a continuation application of U.S. patent application Ser. No. 15/371,003, filed on Dec. 6, 2016, which claims priority to U.S. Provisional Patent Application Ser. No. 62/264,612, filed on Dec. 8, 2015, each of which is fully incorporated by reference for all purposes.

TECHNICAL FIELD

The present disclosure relates generally to computer and network system, and more particularly relates to users notification systems and methods regarding events of varied importance, relevancy, and urgency.

BACKGROUND

Users are increasingly relying upon various electronic and computing devices to track, receive, and update various types of information and handle various types of tasks. For example, many users rely upon computing devices to maintain and organize schedules and provide them with reminders for events and notifications of incoming communications, news, and other such information. These reminders and notifications typically come in the form of an alert. In order to alert the user to the receipt of the notification data and/or the new instant message indicated by the notification data, the computing device may output the message with text displayed on a display screen to indicate to the user that the new instant message was received.

Conventional notification-based alert fail in obtaining the attention of the user at a particular time. At other times, although the output of an alert may succeed in obtaining the attention of the user, the output of the alert may be perceived as a distraction, disruption, and/or annoyance, at a particular time since users are increasingly utilizing multiple computing devices, where each device is often tethered to the same email, messaging accounts, and the users are often bombarded with the same reminders and notifications simultaneously on all devices, resulting in multiple redundant audible and visual alerts. As technology advances it can be advantageous to adapt the ways in which these notification alerts are presented to users.

SUMMARY

Disclosed herein are systems and methods for a notification management system (NMS) that operates within a system hardware and software architecture and manages sending notification messages to users. The NMS system architecture may comprise a plurality of communication networks, a plurality of mobile devices, and plurality of wearable computing devices. The NMS system enables companies to send notifications to users about events relevant to the businesses to act upon notified events in a timely manner without necessarily interrupting tasks the users may be performing when the notification is delivered. The process of the present disclosure comprising automatically sending notifications to users about events relevant to the users' business, alert the users about the incoming notifications, and collect responses from the users when the originating events require a response from the user allows the companies networking and communication system to be efficient, and further allows companies to perform large amounts of work in large data sets in an efficient manner while avoiding time-consuming analysis manually performed by humans.

In an embodiment, a method comprises receiving, by a mobile electronic device associated with a user, a notification message from a computing device, wherein the notification message comprises at least an event impact record and a notification urgency record corresponding to the user of the mobile electronic device, wherein the user of the mobile electronic device is identified by matching biometric data of the user with local biometric data stored in a database. The method further comprises generating, by the mobile electronic device, first sensory output signals and second sensory output signals. The mobile computing device is configured to store a plurality of sensory alerts presets of the first sensory output signals and the second sensory output signals. The method further comprises generating, by the mobile electronic device, an impact sensory alert. The impact sensory alert is generated based on the comparison between the event impact record with the plurality of sensory alerts presets of the first sensory output signals and the second sensory output signals. The method further comprises generating, by the mobile electronic device, an urgency sensory alert. The urgency sensory alert is generated based on the comparison between the notification urgency record with the plurality of sensory alerts presets of the first sensory output signals and the second sensory output signals. The method further comprises outputting, by the mobile electronic device, the impact sensory alert and the urgency sensory alert via the first sensory output signals and second sensory output signals.

In another embodiment, a method comprises generating, by a computing device, a notification message from one or more records in a database where the notification message comprises at least an event impact record and a notification urgency record. The method comprises receiving, at the mobile electronic device associated with an user the notification message from the computing device upon identification of the mobile electronic device. The user of the mobile electronic device is identified by matching biometric data of the user with local biometric data stored in the database. The notification message comprises a first notification record, a second notification record, and a response request record. The method further comprises generating, by the mobile electronic device, first sensory output signals and second sensory output signals, and stores a plurality of sensory alerts presets of the first sensory output signals and the second sensory output signals. The method further comprises generating, by the mobile electronic device, a first sensory alert via the first sensory output signals and the second sensory output signals. The first sensory alert is generated by comparing the first notification record with the plurality of sensory alerts presets of the first sensory output signals and the second sensory output signals. The method further comprises generating, by the mobile electronic device, a second sensory alert via the first sensory output signals and the second sensory output signals. The second sensory alert is generated by comparing the second notification record with the plurality of sensory alerts presets of the first sensory output signals and the second sensory output signals. The method further comprises creating, by the mobile electronic device, a response request form based upon the response request record.

In another embodiment, a computing system comprises a wireless transceiver, and a memory that stores a plurality of sensory alert presets of a first sensory output device and a second sensory output device. The computing device further comprises an user notification system, operatively coupled to the first sensory output device, the second sensory output device, and the wireless transceiver. The user notification system is configured to receive an user notification message from a computing device via the wireless transceiver upon identification of the user of the user notification system. The user of the user notification system is identified by matching biometric data of the user with local biometric data stored in a database. The notification message comprises an event impact record and a notification urgency record. The user notification system is further configured to create an impact sensory alert by comparing the event impact record with the plurality of sensory alert presets of a first sensory output device and a second sensory output device. The user notification system is further configured to create an urgency sensory alert by comparing the notification urgency record with the plurality of sensory alert presets of a first sensory output device and a second sensory output device. The user notification system is further configured to execute the impact sensory alert and the urgency sensory alert via the first sensory output device and the second sensory output device.

In another embodiment, a method comprises retrieving, by a server, an uncharacterized event record from an event database, wherein the uncharacterized event record is associated with a first user and a second user. The method comprises characterizing, by the server, the uncharacterized event record, wherein characterizing comprises assigning a value to the uncharacterized event record based on an event impact value that characterizes an impact of the uncharacterized event record, a first user identifier, and a second user identifier. The method comprises generating, by the server, a notification record, wherein the notification record comprises the characterized event record and a notification urgency value. The method comprises generating, by the server, a sensory alert notification, wherein the sensory alert notification is based on the notification record and the notification urgency value, wherein the sensory alert notification comprises at least one of a repeat and intensity rate of vibrating pulses, a repeat and a pitch rate of an audible alert, and a repeat rate and visual alert, and wherein: when the notification urgency value is associated with an urgent negative notification record, then the sensory alert notification has a first setting of vibrating pulses, audible alert, and visual alert, when the notification urgency value is associated with a non-urgent negative notification record, then the sensory alert notification has a second setting of vibrating pulses, audible alert, and visual alert, when the notification urgency value is associated with an urgent positive notification record, then the sensory alert notification has a third setting of vibrating pulses, audible alert, and visual alert, and when the notification urgency value is associated with a non-urgent positive notification record, then the sensory alert notification has a fourth setting of vibrating pulses, audible alert, and visual alert. The method further comprises transmitting, by the server, the sensory alert notification to a mobile computing device associated with the second user.

In another embodiment, a computer system comprises a server, which is configured to retrieve an uncharacterized event record from an event database, wherein the uncharacterized event record is associated with a first user and a second user. The server is configured to characterize the uncharacterized event record, wherein characterizing comprises assigning a value to the uncharacterized event record based on an event impact value that characterizes an impact of the uncharacterized event record, a first user identifier, and a second user identifier. The server is configured to generate a notification record, wherein the notification record comprises the characterized event record and a notification urgency value. The server is configured to generate a sensory alert notification, wherein the sensory alert notification is based on the notification record and the notification urgency value, wherein the sensory alert notification comprises at least one of a repeat and intensity rate of vibrating pulses, a repeat and a pitch rate of an audible alert, and a repeat rate and visual alert, and wherein: when the notification urgency value is associated with an urgent negative notification record, then the sensory alert notification has a first setting of vibrating pulses, audible alert, and visual alert, when the notification urgency value is associated with a non-urgent negative notification record, then the sensory alert notification has a second setting of vibrating pulses, audible alert, and visual alert, when the notification urgency value is associated with an urgent positive notification record, then the sensory alert notification has a third setting of vibrating pulses, audible alert, and visual alert, and when the notification urgency value is associated with a non-urgent positive notification record, then the sensory alert notification has a fourth setting of vibrating pulses, audible alert, and visual alert. The server is further configured to transmit the sensory alert notification to a mobile computing device associated with the second user.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

FIG. 16 is a table of exemplary data including sensory alerts presets for characterized notification messages, according to an embodiment.

FIG. 17 is a table of exemplary data including text strings, response data type, input control type, and button type, according to an embodiment.

DETAILED DESCRIPTION

Figure 1:
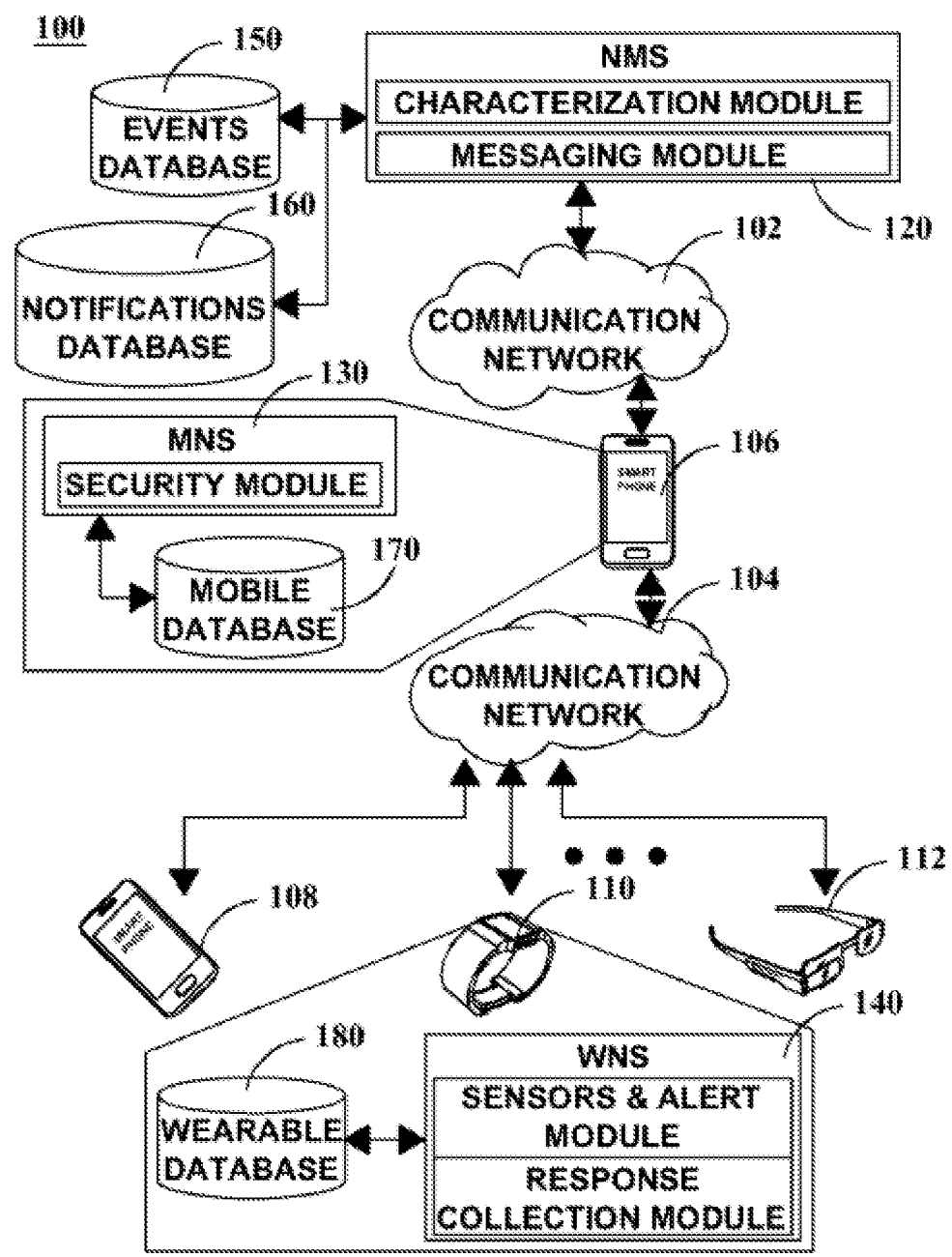
FIG. 1 is a block diagram illustrating a system for notifying users of relevant events, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

System Components and Architecture

FIG. 1 is a block diagram illustrating a system 100 for notifying users of relevant events, according to an embodiment. In FIG. 1, system 100 includes Notification Management System (NMS) 120, Mobile Notification System (MNS) 130, Wearable Notifications Management System (WNS) 140, events database 150, notifications database 160, mobile database 170, wearable database 180, communication network 102, communication network 104, mobile device 106, and wearable devices 108, 110 and 112, among others. In the present disclosure, the terms "wearable device" and "wearable computing device" are used interchangeably. Also, the term "user" and "agent" are used interchangeably.

In some embodiments, NMS 120 includes one or more programs executing one or more software modules, such as, one or more characterization modules and one or more messaging modules. The software modules operating within NMS 120 are further described in FIGS. 5 and 6, below. In these embodiments, MNS 130 includes one or more programs executing one or more software modules, such as, one or more security modules. The one or more programs executing software modules operating within MNS 130 are further described in FIG. 7, below. Further to these embodiments, WNS 140 includes one or more programs executing one or more software modules, such as, one or more sensors and alerts modules, and one or more response collection modules. The software modules operating within WNS 140 are further described in FIGS. 8 and 9, below. It should be understood that system 100 can include more components, less components, or different components depending on desired goals.

Each of the different software components of system 100 may be implemented within any type of suitable processor-controlled device that receives, processes, and/or transmits digital data, example of which are configured as further described in FIGS. 2-4, below. Examples of devices incorporating one or more suitable processors for running one or more algorithms executing software that manages customer data, events, and notifications include smart watches, smartphones, desktop computers, laptop computers, servers, tablets, PDAs, and the like.

In FIG. 1, NMS 120 is operating on a server (not shown, but described in FIG. 2, below) operatively coupled to and in bi-directional communication with one or more events databases 150, notifications databases 160, and communication networks 102. In some embodiments, communication network 102 is operatively coupled to and in bi-directional communication with one or more computing devices 106. In these embodiments, computing devices 106 are operatively coupled to and in bi-directional communication with communication network 104. Further to these embodiments, computing devices 106 each include its own MNS 130 as well as one or more mobile databases 170 that are operatively coupled to and in bi-directional communication with one another. In some embodiments, communication network 104 is operatively coupled to and in bi-directional communication with computing devices 108, 110, and/or 112. In these embodiments, each computing device 108, 110, and 112 includes its own WNS 140 and wearable database 180 that are operatively coupled to and in bi-directional communication with one another.

In some embodiments, events database 150 is a database that receives, stores, and provides event records to authenticated senders/requestors. In the present disclosure, authenticated senders/requesters means authenticated user accounts/identifiers, and authenticated user accounts/identifiers for other users such as company employees, that are authorized to receive and/or provide records to one or more databases of system 100. In these embodiments, the event records comprise event record data that includes relevant information pertaining to events associated with a plurality of users. Further to these embodiments, data included within the event records comprises an event's details data, the customer to which the event is related, the user to which the event is related, and the response request information. Examples of event details data includes an event identifier, an event type, notes related to the event, a short description of the event, and a detailed description of the event, among others. Examples of response request information include a text string to be displayed on the graphical user interface of a computing device when requesting the response, and a data type of the requested response (e.g., text, numeric, and Boolean, among others) for use in producing an user response. Events database 150 is further described in FIGS. 5 and 6, below.

In some embodiments, events records within events database 150 are routinely populated with record data by additional company's servers (not shown). In these embodiments, additional company's servers are operatively coupled to the system 100 through one or more suitable network connections and the record data is stored at events database 150. Further to these embodiments, companies' servers may include an associated database and one or more associated software modules.

Events database 150 may be implemented as a database management system, such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data, such as, for example, a relational database, a multi-dimensional database, and the like.

In some embodiments, notifications database 160 receives, stores, and provides notification records to authenticated senders/requestors. In these embodiments, the notification records comprise notification record data that includes information pertaining to characterized notifications associated with and derived from event records within events database 150. Examples of notification record data include: an associated event identifier; the event impact record; the notification identifier; the notification description; the urgency of the associated notification; a notification message based on certain records from notification database 160; and an user response to the notification message, among others. Notifications database 160 is further described in FIGS. 5 and 6, below.

In some embodiments, the characterization module within NMS 120 retrieves information associated with an event from events database 150, creates notification description records associated with the event, determines the event impact, determines the associated notification urgency and stores the characterized notification information as well as the determined impact and urgency at notifications database 160.

In some embodiments, the messaging module within NMS 120 creates the notification message based on records from notification database 160 and sends a signal to MNS 130 including the created notification message. In these embodiments, the messaging module embeds notification records within the notification message and the embedded notification records include associated event impact, associated urgency, and associated response request, among others.

Notifications database 160 may be implemented as a database management system, such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data, such as, for example, a relational database, a multi-dimensional database, and the like.

In some embodiments, mobile database 170 refers to a database that receives, stores, and provides mobile records to authenticated senders/requestors. In these embodiments, the mobile records comprise mobile record data that includes a notification message received from a notification management system, such as, NMS 120; an associated user response; an authorized user's biometric data; and a mobile notification message. Examples of user biometric data include biometrics obtained by sensors on a wearable device which uniquely identify the user, such as, for example fingerprint, heart rate, pulse, voice, iris image, facial recognition, among others. Mobile database 170 is further described in FIG. 7, below.

In some embodiments, the security module within MNS 130 creates the mobile notification message based on the notification message received from NMS 120. In these embodiments, the security module sends signals to WNS 140 through communication network 104 to instruct WNS 140 to provide local biometric data to MNS 130, as well as instructing mobile database 170 to provide user biometric data to MNS 130. Further to these embodiments, the security module sends signals to WNS 140 to send the mobile notification message to WNS 140 when the security module finds a match between the user biometric data and the local biometric data.

In these embodiments, the notification message received from the notification management system and the mobile notification message created by the security module include embedded notification records, such as, for example event impact, urgency, and an associated response request among others.

Mobile database 170 may be implemented as a database management system (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data, such as, for example, a relational database, a multi-dimensional database (MDB), and the like.

In some embodiments, wearable database 180 refers to a database that receives, stores, and provides wearable records to authenticated senders/requestors. In these embodiments, the wearable records comprise wearable record data that includes a mobile notification message received from a mobile notification system, such as MNS 130, an associated user's response, local biometric data, as well as sensory alerts presets. Examples of local biometric data include biometrics obtained by sensors on a wearable device, which uniquely identify the user currently wearing the wearable device, such as, for example fingerprint, heart rate, pulse, voice, iris image, facial recognition, among others. Wearable database 180 is further described in FIGS. 8 and 9, below.

In some embodiments, the sensors and the alert module within WNS 140 sends signals to MNS 130 to request MNS 130 to provide a notification message to WNS 140. In these embodiments, the sensors and the alerts module instructs wearable database 180 to store the received notification message and instructs wearable database 180 to provide associated sensory alerts presets to WNS 140. In some embodiments, the mobile notification message received from the mobile notification system includes embedded notification records, such as, for example associated event impact, associated urgency, and associated response request among others.

Further to these embodiments the sensors and alerts module controls a plurality of vibration actuators, speakers, and LED/display devices to output a combination of vibrating pulses, sounds, and light alerts on WNS 140 corresponding to the associated sensory alerts presets. In the present disclosure, devices that "execute" sensory alerts (e.g., under the control of the sensors and alert modules), such as vibration actuators, speakers, and LED/display devices, are sometimes called "sensory output devices". The human-perceptible output signals of these devices, such as vibrating pulses, sound alerts, and light alerts, are sometimes herein called "sensory outputs", or "sensory output signals".

As used in the present disclosure, "sensory alerts" are outputs of a wearable device that can be sensed by an user; these are also sometimes called stimuli herein as they are intended to stimulate a response from the user of the wearable device. As used in the present disclosure, "sensory alerts presets" are preset values of output parameters for given types of sensory alert. Examples of sensory alerts presets include presets for the repeat rate and intensity of vibrating pulses, repeat rate and pitch of beeps of sound, and repeat rate and color of blinks of light, executed by an associated wearable device. In an embodiment, a wearable device associated with a mobile notification message executes sensory alerts presets based on the urgency associated with the notification message, and the impact value associated with the notification message.

In these embodiments, the sensory alerts presets are a collection of available orthogonal triple redundant sensory alerts, intended to alert an user to a notification message. As used herein, "orthogonal redundant sensory alerts" refer to sensory alerts that provide multiple stimuli (such as stimuli selected from vibration, sound, and light), where the information conveyed by the multiple stimuli is completely unique and does not intersect. Generally, these stimuli are based upon available sensory outputs of the wearable device. The term "orthogonal triple redundant" sensory alert refers to sensory alerts that provide three different stimuli (such as vibration, sound, and light) that convey unique, non-intersecting information to the user.

In some embodiments, a response collection module within WNS 140 retrieves a notification message from wearable database 180, determines the type of response to be requested from the user, and presents the requested response information to the user. In these embodiments, the response collection module collects a response from the user, and sends a signal to MNS 130 through communication network 104 to communicate the user response to MNS 130.

Wearable database 180 may be implemented as a database management system (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data, such as, for example, a relational database, a multi-dimensional database (MDB), and the like.

In some embodiments, the characterization module within NMS 120 retrieves information associated with an event from events database 150, creates notification description records associated with the event, determines the event impact, determines the associated notification urgency and stores the notification description records as well as the determined impact and urgency at notifications database 160.

In these embodiments, the messaging module within NMS 120 is implemented as one or more messaging modules comprising computer software that includes programmatic rules or logic for instructing notification database 160 to provide information associated with a characterized notification to NMS 120. Further to these embodiments, the messaging module includes programmed logic for creating a notification message, instructing mobile database 160 to store the created notification message, and sending signals to MNS 130 through communication network 102 to communicate the created notification message to MNS 130.

In some embodiments, the security module within MNS 130 is implemented as one or more security modules comprising computer software that includes programmatic rules or logic for instructing mobile database 170 to provide notification messages to MNS 130. In these embodiments, the security module includes programmatic rules or logic for creating a mobile notification message and instructing mobile database 170 to store the mobile notification message. Further to these embodiments, the security module comprises computer software that includes programmatic rules or logic for sending signals to WNS 140 through communication network 104 to instruct WNS 140 to provide local biometric data to MSN 130, as well as instructing mobile database 170 to provide user biometric data that has been confirmed for an authorized user to MNS 130. (In the present disclosure, the terms "user biometric data" and "confirmed biometric data" are used interchangeably). Yet further to these embodiments, the security module includes programmatic rules or logic for sending signals to WNS 140 to send the mobile notification message to WNS 140 when the security module finds a match between the confirmed biometric data and the local biometric data.

In some embodiments, the sensors and alert module within WNS 140 is implemented as one or more security modules comprising computer software that includes programmatic rules or logic for sending a signal to MNS 130 to request MNS 130 to provide a notification message to WNS 140. In these embodiments, the sensors and alerts module includes programmatic rules or logic for instructing wearable database 180 to store the received notification message and instructing wearable database 180 to provide associated sensory alerts presets to WNS 140. Further to these embodiments the sensors and alerts module includes programmatic rules or logic for controlling a plurality of vibration actuators, speakers, and LED/display devices to execute a combination of vibrating pulses, sound alerts, and light alerts on WNS 140 corresponding to the associated sensory alerts presets.

In some embodiments, the sensors and alerts module includes programmatic rules or logic for checking user interaction with the WNS 140, and displaying infographics on WNS 140 when the sensors and alerts module detects signals indicating that the user has moved WNS 140 to a position to view the display of WNS 140.

In some embodiments, a response collection module within WNS 140 includes programmatic rules or logic for retrieving a mobile notification message from wearable database 180, and extracting a response request record embedded within the mobile notification message. In these embodiments, the response collection module includes programmatic rules or logic for determining a text string and a data type from the extracted response request record. Further to these embodiments, the response collection module includes programmatic rules or logic for creating a form based on the text string and data type, displaying the form on the user interface of WNS 140, and collecting a response from an user.

In some embodiments, text strings and data types are included within the mobile notification message as part of the mobile notification message format. In an example, a text string and a response data type are included within a mobile notification message as headers within an email message compliant with RFC 2047, 4021, and the like. Examples of text strings and data types embedded within a mobile notification message are further described in FIG. 17, below.

In some embodiments, the response collection module includes programmatic logic or rules for sending a signal to MNS 130 through communication network 104 to communicate the user response to MNS 130. In these embodiments, MNS 130 includes programmatic logic or rules for instructing mobile database 170 to store the user response. Further to these embodiments, MNS 130 includes programmatic logic or rules for sending signals including the user response to NMS 120 through communication network 102 to communicate the user response to NMS 120. In these embodiments, NMS 120 includes programmatic logic or rules to instruct notifications database 160 to store the user response.

In operation, the characterization module within NMS 120 retrieves information associated with an event from events database 150, creates notification description records associated with the event, determines the event impact, determines the associated notification urgency and stores the notification description records as well as the determined impact and urgency at notifications database 160.

In some embodiments, the messaging module within NMS 120 retrieves notification description records, associated event impact, and urgency from notifications database 160, creates a notification message including notification description and associated event impact and urgency records, and communicates the notification message to MNS 130 through communication network 102. In these embodiments, the security module within MNS 130 communicates with NMS 120 through communication network 102 to retrieve a notification message, creates a mobile notification based on the received notification message, communicates with WNS 140 through communication network 104 to retrieve the local biometric data from WNS 140, and retrieves user biometric data (i.e., confirmed biometric data) from mobile database 170. Further to these embodiments, the security module compares the user biometric data with the local biometric data received from WNS 140, and communicates the mobile notification message to the WNS when the security module determines a match between the confirmed biometric data and the local biometric data.

In some embodiments, the sensors and alerts module within WNS 140 receives a mobile notification message from MNS 130, stores the mobile notification message at wearable database 180, determines if the mobile notification message requires sensory alerts to be played, and retrieves sensory alerts presets from wearable database 180. In these embodiments, the sensors and alerts module matches the mobile notification message to the corresponding sensory alert, and controls a plurality of vibration actuators, speakers, and LED/display devices to execute a combination of vibrating pulses, sound alerts, and light alerts, corresponding to the matching presets, on WNS 140. Further to these embodiments, the sensors and alerts module retrieves gyroscopic data, and gestures sensors data, among other data from a plurality of sensors to determine a position of WNS 140. Yet further to these embodiments, the sensors and alerts module displays infographics on WNS 140 when the sensors and alerts module determines that the user wearing WNS 140 has moved WNS 140 to a position to view the display of WNS 140.

In some embodiments, the response collection module within WNS 140 retrieves a mobile notification message from wearable database 180, determines the type of response to be requested from the user based on the response requested information embedded within the notification message, presents the response request information to the user, and collects an user response. In these embodiments, the response collection module communicates the user response to MNS 130 through communication network 104. Further to these embodiments, MNS 130 stores the user response received from WNS 140 within mobile database 170, and communicates the response to NMS 120 through communication network 102. Yet further to these embodiments, NMS 120 stores the user response from received from MNS 130 within notifications database 160.

In some embodiments, the aforementioned modules are implemented as a set of computer instructions executed by central processing units (not shown, but described in FIG. 2) that may run computer executable program instructions or related algorithms. In these embodiments, NMS 120, MNS 130, WNS 140, and computing devices 108, 110, and 112 each include their own central processing unit.

In some embodiments, NMS 120, MNS 130, WNS 140, and computing devices 108, 110, and 112 are employed in a distributed configuration. Moreover, network infrastructures such as communication network 102 and communication network 104 facilitate interaction between the components of the system for notifying relevant events to users. Examples of suitable network infrastructures include intranets, local area networks (LAN), virtual private networks (VPN), wide area networks (WAN), the World Wide Web, and the like.

Figure 2:
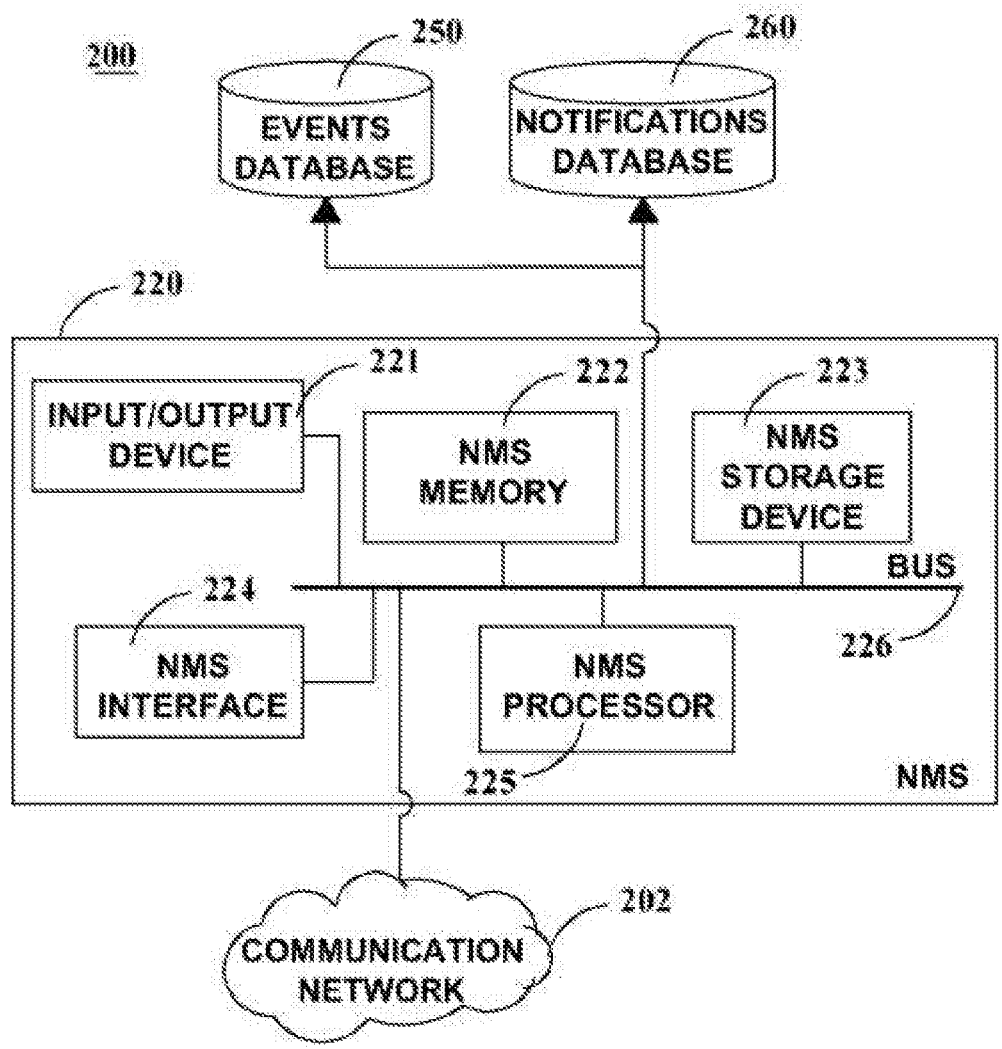
FIG. 2 is an exemplary notification management system (NMS) computing device in which one or more embodiments of the present disclosure may operate, according to an embodiment.

FIG. 2 is an exemplary notification management system computing device in which one or more embodiments of the present disclosure may operate, according to an embodiment. In FIG. 2, system 200 includes Notification Management System (NMS) 220, events database 250, notifications database 260, and communication network 202. NMS 220 includes NMS input/output (I/O) device 221, NMS memory 222, NMS storage device 223, NMS local interface 224, NMS processor 225, and NMS bus 226. System 200 may include additional, fewer, different, or differently arranged components than those illustrated in FIG. 2.

As used in the present disclosure, the term "memory" encompasses various computer components, devices, and recording media for retaining digital data, which may be identified as "memory" and may be identified using other terms such as storage device.

In FIG. 2, NMS 220 is operatively coupled to and in bi-directional communication with one or more events databases 250, notifications databases 260, and communication network 202. In these embodiments, NMS bus 226 is operatively coupled to and in bi-directional communication with input/output (I/O) device 221, NMS memory 222, NMS storage device 223, NMS local interface 224, and NMS processor 225. Further to these embodiments, NMS bus 226 includes a path that permits components within NMS 220 to communicate with one another.

Examples of NMS (I/O) device 221 include peripherals and/or other mechanism that may enable a user to input information to NMS 220, including a keyboard, computer mice, buttons, touch screens, microphones, voice recognition, biometric mechanisms, and the like. NMS (I/O) devices 221 also include a mechanism that outputs information to the user of NMS 220, such as, for example a display, a light emitting diode (LED), a printer, a speaker, and the like.

Examples of NMS local interface 224 include mechanisms that enable NMS 220 to communicate with other computing devices and/or systems through network connections such as communication network 202. Examples of network connections include any suitable connection between computers, such as, for example intranets, local area networks (LANs), virtual private networks (VPNs), wide area networks (WANs), the Internet, and the like. Examples of NMS memory 222 include random access memory (RAM), read-only memory (ROM), flash memory, and the like. Examples of NMS storage device 223 include magnetic and/or optical recording medium, ferro-electric RAM (F-RAM) hard disks, solid-state drives, floppy disks, optical discs, and the like. In one embodiment, NMS memory 222 stores information and instructions for execution by NMS processor 225. In yet another embodiment, NMS processor 225 includes a microprocessor, an application specific integrated circuit (ASIC), or a field programmable object array (FPOA), and the like. In these embodiments, NMS processor 225 interprets and executes instructions retrieved from NMS memory 222 and NMS storage device 223.

In an example and referring to FIG. 1 Notification Management System 220 implements the programmatic logic and/or rules associated with Notification Management System 120 of system 100, and communication network 202 implements the programmatic logic and/or rules associated with communication network 102. Further to this example, events database 250 and notifications database 260 implement the programmatic logic and/or rules associated with events database 150 and notifications database 160 of system 100.

Examples of these implementations include servers, authorized computing devices, smartphones, desktop computers, laptop computers, tablet computers, PDAs, and other types of processor-controlled devices that may receive, process, transmit digital data, and the like. Additionally, NMS 220 may perform certain operations that are required for the proper operation of system 100. In some embodiments, NMS 220 may perform these operations in response to NMS processor 225 executing software instructions contained in a computer-readable medium, such as, NMS memory 222. Each NMS processor 225 unit may be a component of computing devices such as a server, a single computer, or multiple computers in a distributed configuration.

In some embodiments, the software instructions of NMS 220 are read into NMS memory 222 from another memory location, such as NMS storage device 223, or from another computing device via NMS local interface 224. In this embodiment, the software instructions contained within NMS memory 222 cause NMS processor 225 to perform processes that will be described in FIGS. 10 and 11, below. Alternatively, hardwired circuitry may be used in place of or in combination with software instructions to implement processes described herein. Thus, implementations described herein are not limited to any specific combination of hardware circuitry and software.

Figure 3:
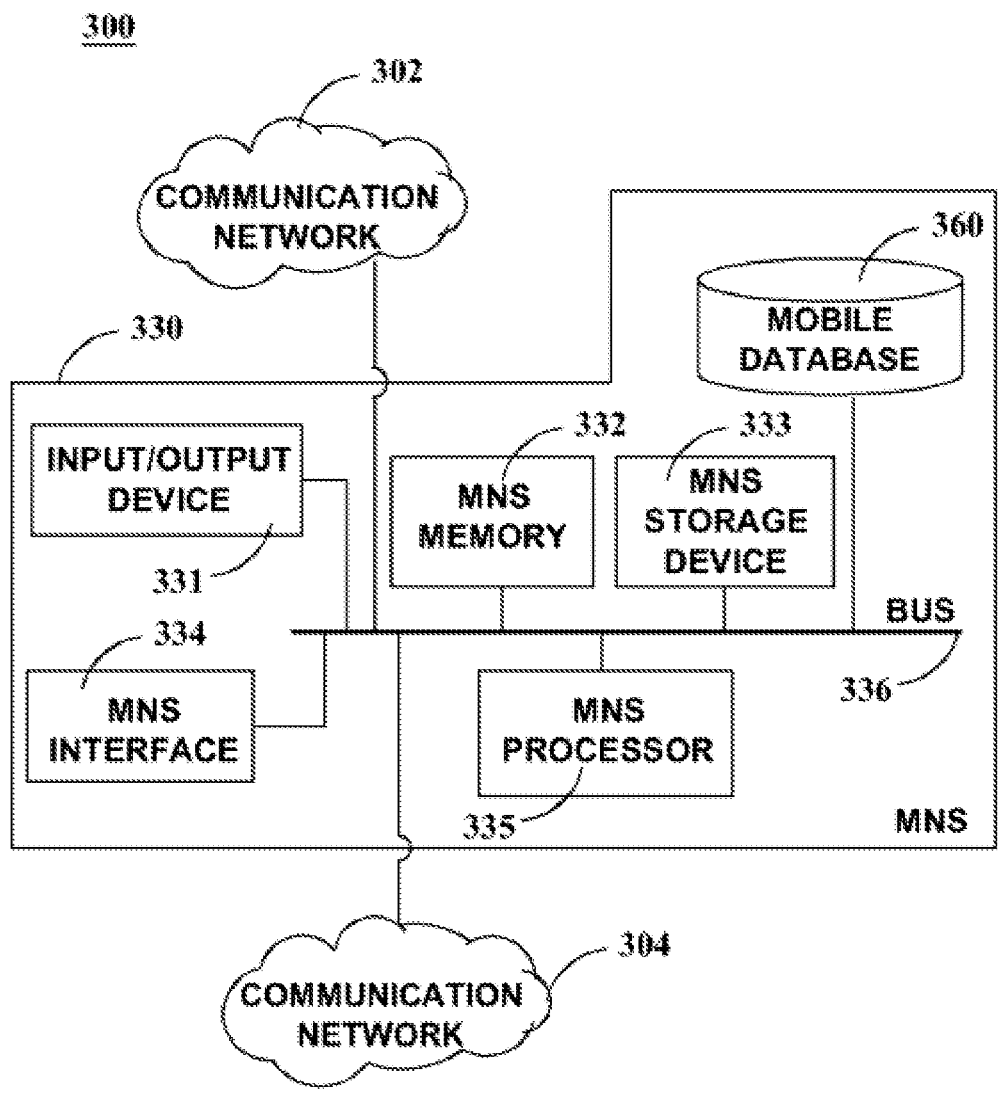
FIG. 3 is an exemplary mobile notification system (MNS) computing device in which one or more embodiments of the present disclosure may operate, according to an embodiment.

FIG. 3 is an exemplary mobile notification system computing device in which one or more embodiments of the present disclosure may operate, according to an embodiment. In FIG. 3, system 300 includes Mobile Notification System (MNS) 330, communication network 302, and communication network 304. MNS 330 includes mobile database 360, MNS input/output (I/O) device 331, MNS memory 332, MNS storage device 333, MNS local interface 334, MNS processor 335, and MNS bus 326. System 300 may include additional, fewer, different, or differently arranged components than those illustrated in FIG. 3.

In FIG. 3, MNS 330 is operatively coupled to and in bi-directional communication with one or more communication network 302, and communication network 304. In these embodiments, MNS bus 336 is operatively coupled and in bi-directional communication with mobile databases 330, input/output (I/O) device 331, MNS memory 332, MNS storage device 333, MNS local interface 334, and MNS processor 335. Further to these embodiments, MNS bus 336 includes a path that permits components within MNS 330 to communicate with one another.

Examples of MNS (I/O) device 331 include peripherals and/or other mechanism that may enable a user to input information to MNS 330, including a keyboard, computer mice, buttons, touch screens, microphones, voice recognition, and biometric mechanisms, and the like. MNS (I/O) devices 331 also include a mechanism that outputs information to the user of MNS 330, such as, for example a display, a light emitting diode (LED), a printer, a speaker, and the like.

Examples of MNS local interface 334 include mechanisms that enable MNS 330 to communicate with other computing devices and/or systems through network connections such as communication network 302 and communication network 304. Examples of network connections include any suitable connections between computers, such as, for example intranets, local area networks (LANs), virtual private networks (VPNs), wide area networks (WANs), the Internet, and the like. Examples of MNS memory 332 include random access memory (RAM), read-only memory (ROM), flash memory, and the like. Examples of MNS storage device 333 include magnetic and/or optical recording medium, ferro-electric RAM (F-RAM) hard disks, solid-state drives, floppy disks, optical discs, and the like. In one embodiment, MNS memory 332 store information and instructions for execution by MNS processor 335. In yet another embodiment, MNS processor 335 include a microprocessor, an application specific integrated circuit (ASIC), or a field programmable object array (FPOA), and the like. In these embodiments, MNS processor 335 interprets and executes instructions retrieved from MNS memory 332 and MNS storage device 333.

In an example and referring to FIG. 1 Mobile Notification System 330 implements the programmatic logic and/or rules associated with Mobile Notification System 130, communication network 302 implements the programmatic logic and/or rules associated with communication network 102, and communication network 304 implements the programmatic logic and/or rules associated with communication network 104 of system 100. Further to this example, mobile database 360 implements the programmatic logic and/or rules associated with mobile database 160 of system 100.

Examples of these implementations include laptop computers, portable computers, tablet, PDAs, smartphones, cellular phones, and the like. Additional examples of these implementations include servers, authorized computing devices, desktop computers, and other types of processor-controlled device that may receive, process, transmit digital data, and the like. Additionally, MNS 330 may perform certain operations that are required for the proper operation of system 100. MNS 330 may perform these operations in response to MNS processor 335 executing software instructions contained in a computer-readable medium, such as MNS memory 332. Each MNS processor unit may be a component of computing devices such as laptop computers, portable computers, tablets, PDAs, smartphones, cellular phones, or multiple mobile computers in a distributed configuration.

In some embodiments, the software instructions of MNS 330 are read into MNS memory 332 from another memory location, such as MNS storage device 333, or from another computing device via MNS local interface 334. In these embodiments, the software instructions contained within MNS memory 332 cause MNS processor 335 to perform processes that will be described in FIG. 12, below. Alternatively, hardwired circuitry may be used in place of or in combination with software instructions to implement processes described herein. Thus, implementations described herein are not limited to any specific combination of hardware circuitry and software.

Figure 4:
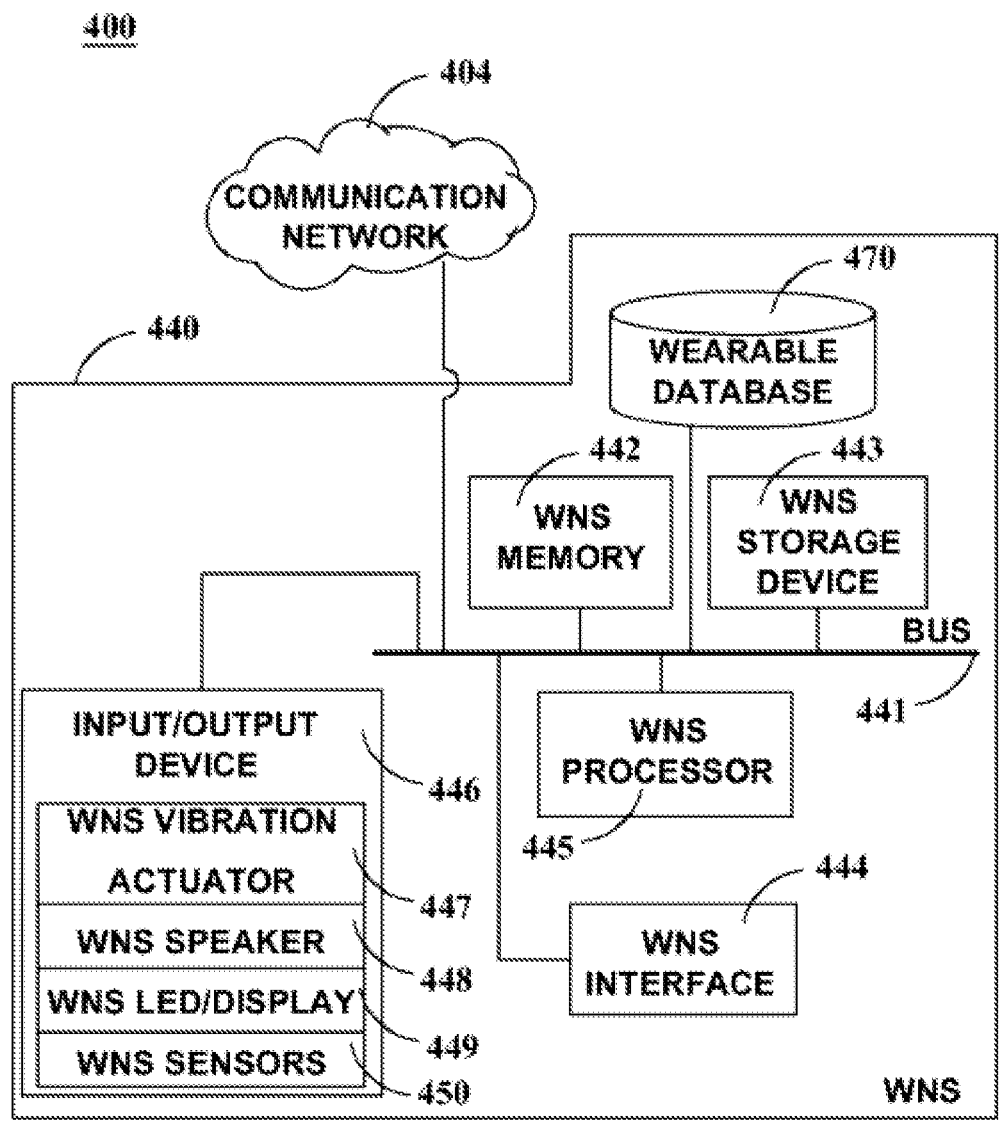
FIG. 4 is an exemplary wearable notification system (WNS) computing device in which one or more embodiments of the present disclosure may operate, according to an embodiment.

FIG. 4 is an exemplary wearable notification system computing device in which one or more embodiments of the present disclosure may operate, according to an embodiment. In FIG. 4, system 400 includes Wearable Notification System (WNS) 440, and communication network 404. WNS 440 further includes wearable database 470, WNS bus 441, WNS memory 442, WNS storage device 443, WNS local interface 444, WNS processor 445, and input/output (I/O) devices 446. In FIG. 4, I/O 446 additionally includes a plurality of I/O devices which are operatively coupled and in bi-directional communication with one another, such as, for example WNS vibration actuator 447, WNS speaker 448, WNS LED/display 449, and WNS sensors 450, among others. System 400 may include additional, fewer, different, or differently arranged components than those illustrated in FIG. 4.

In FIG. 4, WNS 440 is operatively coupled to and in bi-directional communication with one or more wearable databases 470, and communication network 404. In these embodiments, WNS bus 441 is operatively coupled and in bi-directional communication with WNS I/O 446, WNS memory 442, WNS storage device 443, WNS local interface 444, and WNS processor 445. Further to these embodiments, WNS bus 441 includes a path that permits components to communicate with one another.

Examples of WNS sensors 450 include voice biometrics sensors, heart rate biometrics sensors, finger print biometric sensors, gesture sensors, accelerometers, and gyroscopic sensors, among other sensors capable of transducing real world physics variables to electric signals and digital data. Additional examples of I/O 446 include peripherals and/or other mechanism that may enable a user to input information to WNS 440, including a keyboard, microphones, computer mice, buttons, touch screens, and the like. Further examples of I/O 446 include mechanisms that output information to the user of WNS 440, such as, for example a display, a printer, and the like.

Examples of WNS local interface 444 include mechanisms that enable WNS 440 to communicate with other computing devices and/or systems through network connections such as communication network 404. Examples of network connections include any suitable connections between computers, such as, for example intranets, local area networks (LANs), virtual private networks (VPNs), wide area networks (WANs), the Internet, and the like. Examples of WNS memory 442 include random access memory (RAM), read-only memory (ROM), flash memory, and the like. Examples of WNS storage device 443 include magnetic and/or optical recording medium, ferro-electric RAM (F-RAM) hard disks, solid-state drives, floppy disks, optical discs, and the like. In one embodiment, WNS memory 442 stores information and instructions for execution by WNS processor 445. In yet another embodiment, WNS processor 445 includes a microprocessor, an application specific integrated circuit (ASIC), or a field programmable object array (FPOA), and the like. In these embodiments, WNS processor 445 interprets and executes instructions retrieved from WNS memory 442 and WNS storage device 443.

In an example and referring to FIG. 1 Wearable Notification System 440 implements the programmatic logic and/or rules associated with Wearable Notification System 140 of system 100, and communication network 404 implements the programmatic logic and/or rules associated with communication network 104. Further to this example, wearable database 470 implements the programmatic logic and/or rules associated with wearable database 170 of system 100.

Examples of these implementations include wearable computing devices, such as, for example smartphones, tablets, smart bands (e.g., Fitbit®), smartwatches, smart glasses (e.g., Google Glass®), and the like. Additional examples of these implementations include servers, authorized computing devices, desktop computers, laptop computers, tablet computers, PDAs, and other type of processor-controlled device that may receive, process, transmit digital data, and the like. Additionally, WNS 440 may perform certain operations that are required for the proper operation of system 100. Suitable WNS 440 may perform these operations in response to WNS processor 445 executing software instructions contained in a computer-readable medium, such as WNS memory 442. Each WNS processor unit may be a component of wearable computing devices such as, for example smartphones, tablets, smart bands (e.g., Fitbit®), smartwatches, smart glasses, or multiple wearable computers in a distributed configuration.

In some embodiments, the software instructions of WNS 440 are read into WNS memory 442 from another memory location, such as WNS storage device 443, or from another computing device via WNS local interface 444. In this embodiment, the software instructions contained within WNS memory 442 cause WNS processor 445 to perform processes that will be described in FIGS. 13 and 14, below. Alternatively, hardwired circuitry may be used in place of or in combination with software instructions to implement processes described herein. Thus, implementations described herein are not limited to any specific combination of hardware circuitry and software.

Figure 5:
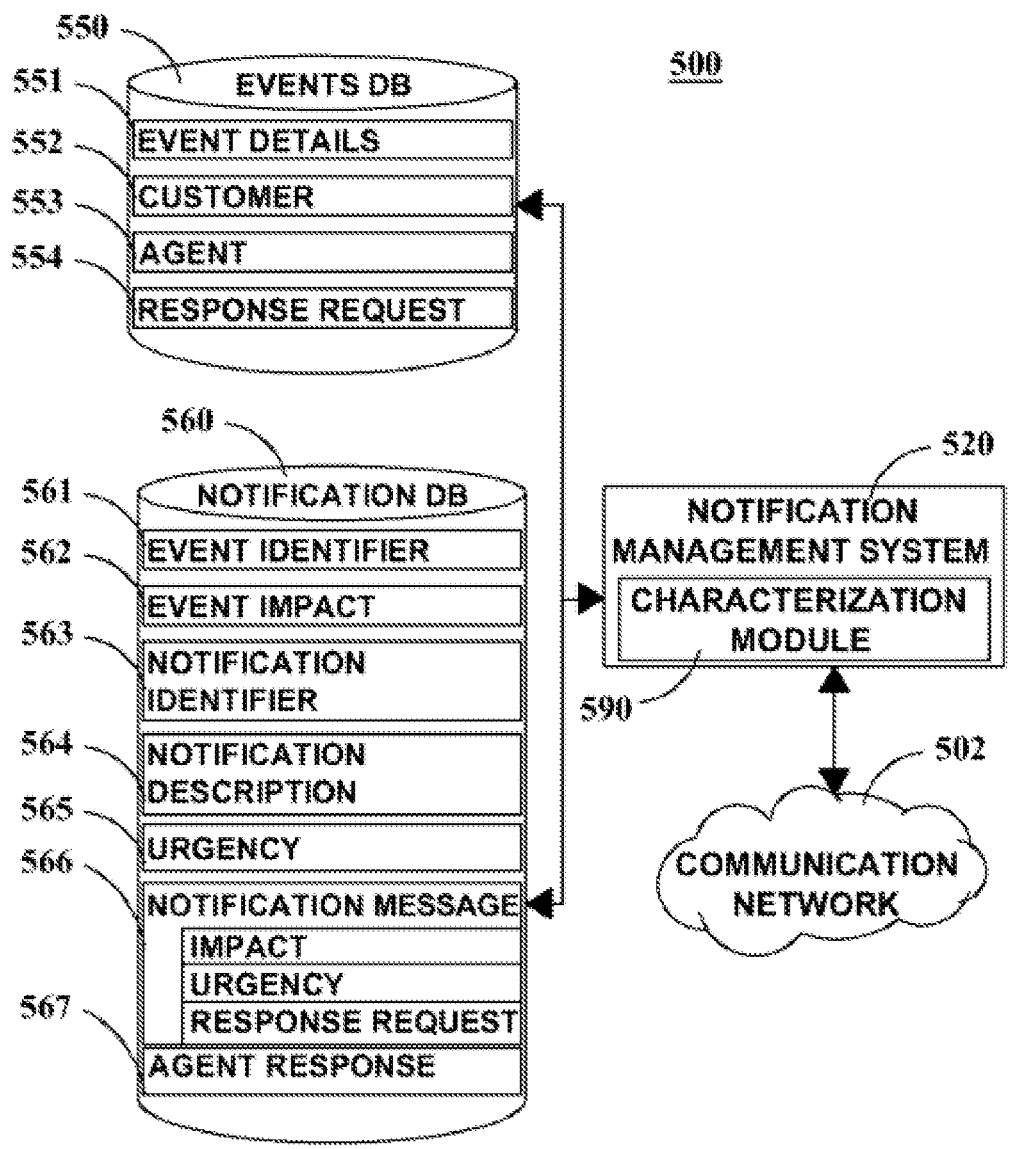
FIG. 5 is a block diagram of an exemplary subsystem of a characterization module within a notification management system (NMS), according to an embodiment.

FIG. 5 is a block diagram of an exemplary subsystem of a characterization module within a notification management system, according to an embodiment. In FIG. 5, subsystem 500 includes Notification Management System (NMS) 520, communication network 504, events database 550, and notification database 560. NMS 520 further includes characterization module 590. It should be understood that subsystem 500 can include less components, more components, or different components depending on the desired analysis goals and that the components may be arranged differently than illustrated in subsystem 500 of FIG. 5.

In FIG. 5, communication network 502, events database 550, and notification database 560 are operatively coupled to and in communication with NMS 520 through a communication network. In an example and referring to FIG. 1, communication network 502 functions in substantially similar manner as communication network 102, events database 550 functions in substantially similar manner as events database 150, and notification database 560 functions in substantially similar manner to notification database 160. Further to these examples, NMS 520 functions in a substantially similar manner as NMS 120 within system 100.

In some embodiments, events database 550 includes a plurality of event records that include relevant information pertaining to events associated with a plurality of users, such as, for example, event details 551, customer 552, agent 553, and response request 554, among others. Examples of information within event details 551 include event identifier, event type, notes related to the event, a short description of the event, and a detailed description of the event, among others. Examples of information within response request 554 include a text string to be displayed on the graphical user interface of a computing device when requesting the response, and a data type of the requested response (e.g., text, numeric, and Boolean, among others) for use in producing an agent response.

In some embodiments, notifications database 560 includes a plurality of notification records including relevant information pertaining to notifications associated with and derived from event records within events database 550. In these embodiments, notification records include event identifier 561, event impact 562, notification identifier 563, notification description 564, notification urgency 565, notification message 566, and agent response 567, among others. Examples of values at impact 562 include "POSITIVE" and "NEGATIVE", among others. Examples of values at notification urgency 565 include "URGENT" and "NOT-URGENT", among others. Examples of information at notification description 564 include addressee, subject, and content, among others.

In an embodiment, values of event impact 562 and notification urgency 565 are characterized using simple classifications relevant to agent response. In an embodiment, the notification system uses binary classification of impact (such as "POSITIVE"/"NEGATIVE"), and binary classification of notification urgency ("URGENT"/"NON-URGENT"). In a notification system in which these data are communicated via sensor alerts of wearable computing devices, these simple, relevant message elements facilitate timely and effective agent recognition and response. In another embodiment, event impact 562 and notification urgency 565 (or either of them) may be classified using a limited number of values greater than two. In a further embodiment, event impact 562 and notification urgency 565 (or either of them) may be classified using a plurality of numerical values.

In some embodiments, characterization module 590 is configured to create notification identifier, description records, impact records, and urgency records based on events records. In these embodiments, characterization module 590 includes programmed logic that enables characterization module 590 to retrieve event details 551 from events database 550, determine event impact 562, create an associated notification identifier 561, create an associated notification description 564, and determine notification urgency 565. Further to these embodiments, characterization module further includes programmed logic to store event identifier 561, event impact 562, notification identifier 563, notification description 564, and notification urgency 565 within notification database 560. In an example, characterization module 590 determines event impact 562 values and notification urgency 565 values by employing fuzzy logic algorithms on event details 551. In an additional example, characterization module 590 determines event impact 562 and notification urgency 565 by utilizing statistical analysis techniques on event details 551 and notifications descriptions 564. In a further example, characterization module utilizes Naïve Bayes Filtering to determine the probability of events and notifications being of a determined impact and urgency respectively. In yet other embodiments, users interact with MNS 520 to set event impact 562 and urgency 565 values.

In some embodiments, the characterization module 590 is implemented as a set of computer instructions executed by one or more NMS processor units that run computer executable program instructions or related algorithms. Each NMS processor unit may be a component of computing devices such as a server, a single computer, or multiple computers in a distributed configuration. In an example, an NMS processor unit as described in FIG. 2 can be implemented within the aforementioned computing devices.

Figure 6:
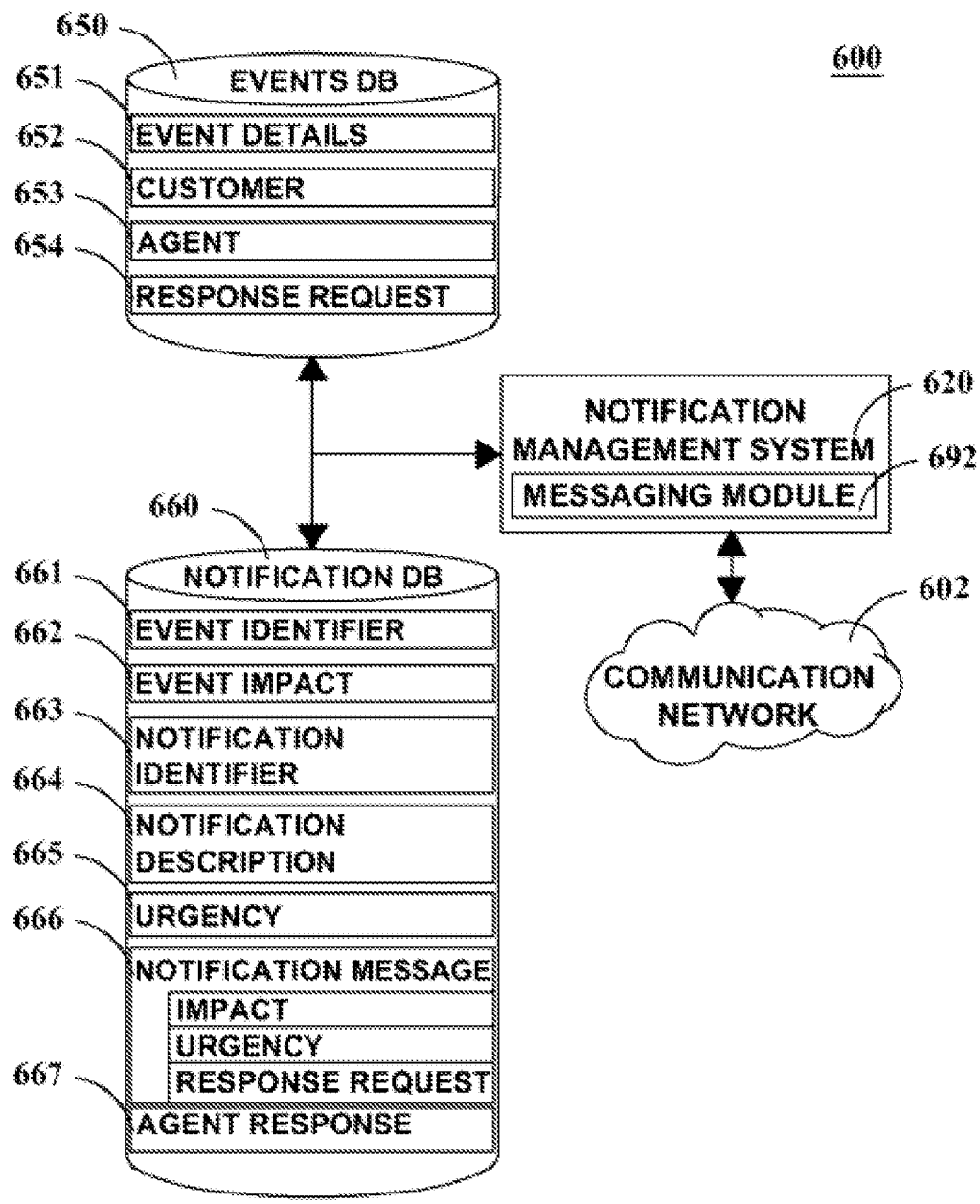
FIG. 6 is a block diagram of an exemplary subsystem of a messaging module within a notification management system (NMS), according to an embodiment.

FIG. 6 is a block diagram of an exemplary subsystem of a messaging module within a notification management system, according to an embodiment. In FIG. 6, subsystem 600 includes Notification Management System (NMS) 620, events database 650, notification database 660, and communication network 602. NMS 620 further includes messaging module 692. It should be understood that subsystem 600 can include less components, more components, or different components depending on the desired analysis goals and that the components may be arranged differently than illustrated in subsystem 600 of FIG. 6.

In FIG. 6, communication network 602, events database 650, and notification database 660 are operatively coupled to and in communication with NMS 620 through a communication network, and messaging module 692 is operatively coupled to and in communication with NMS 620 through a suitable communication network. In an example and referring to FIG. 1, communication network 602 functions in substantially similar manner as communication network 102, events database 650 functions in substantially manner to events database 150, and notification database 660 functions in substantially similar manner as notification database 160 within system 100 respectively. Further to these examples, NMS 620 functions in a substantially similar manner as NMS 120 within system 100.

In some embodiments, events database 650 includes a plurality of event records that include relevant information pertaining to events associated with a plurality of users, such as, for example, event details 651, customer 652, agent 653, and response request 654, among others. Examples of information within event details 651 include event identifier, event type, notes related to the event, a short description of the event, and a detailed description of the event, among others. Example of information within response request 654 include a text string to be displayed on the graphical user interface of a computing device when requesting the response, and a data type of the requested response (e.g., text, numeric, and Boolean, among others) for use in producing an agent response.

In some embodiments, notifications database 660 includes a plurality of notification records including relevant information pertaining to characterized notifications associated with and derived from event records within events database 650. In these embodiments, notification records include event identifier 661, event impact 662, notification identifier 663, notification description 664, notification urgency 664, and response collected 665, among others. Examples of values at event impact 662 include "POSITIVE" and "NEGATIVE", among others. Examples of values at notification urgency 664 include "URGENT" and "NOT-URGENT", among others. Examples of information at notification description 564 include addressee, subject, and content, among others.

In some embodiments, messaging module 692 is configured to create a notification message based on notification records and event records, embed some associated notification records and some event records within the notification message, store the created notification message within notification database 660, and send the created notification message to a Mobile Notification System (MNS) through communication network 602. In an example, notification records embedded messaging module 692 include associated event impact, associated urgency, and associated response request, among others.

In some embodiments, messaging module 692 includes programmed logic to retrieve a plurality of records from notifications database 660, such as, for example impact 662, notification description 664, and urgency 665. In these embodiments, messaging module 692 includes programmed logic to additionally retrieve response request 654 from events database 650 and create a notification message from the records. Further to these embodiments, messaging module includes programmed logic for embedding information from urgency 665, impact 664, and response request 654 within the created notification message.

In some embodiments, messaging module 692 includes programmed logic to store the created notification message at notification message 666 within notification database 660, and communicate the notification message to the MNS through communication network 602. Examples of notification messages created by messaging module 692 include email, MMS, voice mail, and the like.

In some embodiments, messaging module 692 is implemented as a set of computer instructions executed by one or more NMS processor units that run computer executable program instructions or related algorithms. Each NMS processor unit may be a component of computing devices such as servers, desktop computers, laptop computers, computers, tablets, PDAs, smartphones, cellular phones, or multiple mobile computers in a distributed configuration. In an example, an NMS processor unit as described in FIG. 2 can be implemented within the aforementioned computing devices.

Figure 7:
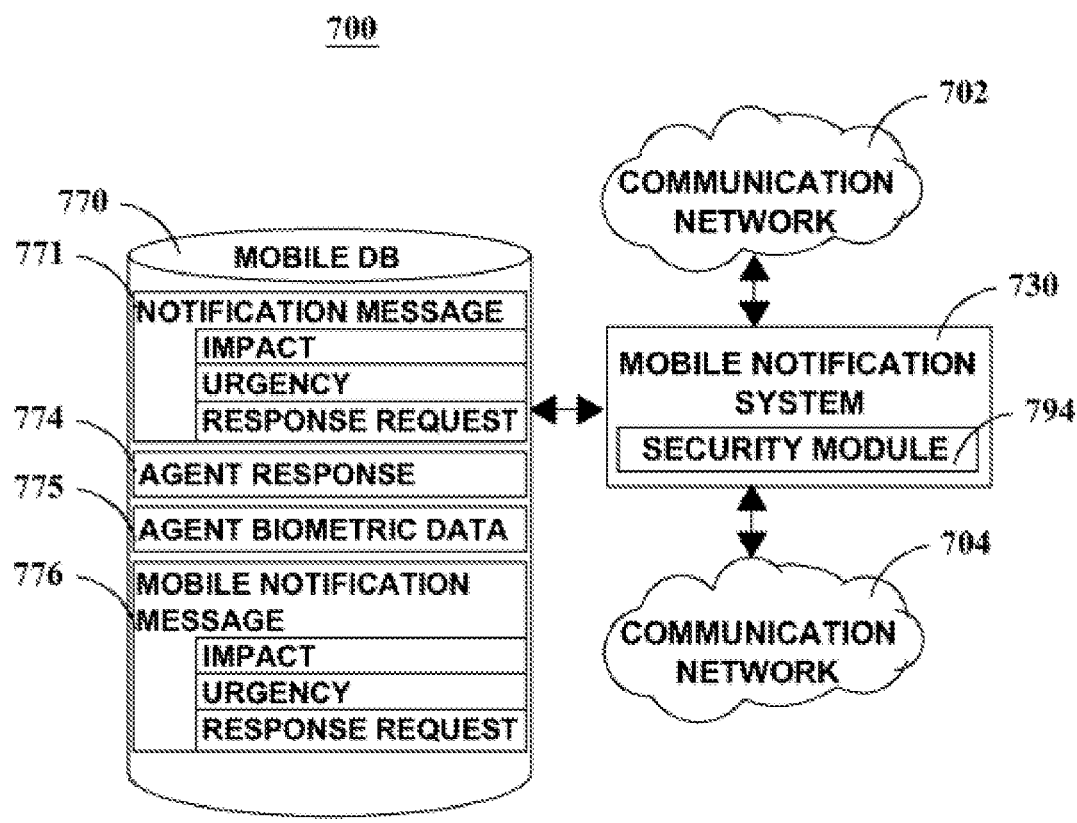
FIG. 7 is a block diagram of an exemplary subsystem of a security module within a mobile notification system (MNS), according to an embodiment.

FIG. 7 is a block diagram of an exemplary subsystem of a security module within a mobile notification system, according to an embodiment. In FIG. 7, subsystem 700 includes Mobile Notification System (MNS) 730, mobile database 770, communication network 702, and communication network 704. MNS 730 further includes security module 794. It should be understood that subsystem 700 can include less components, more components, or different components depending on the desired analysis goals and that the components may be arranged differently than illustrated in subsystem 700 of FIG. 7.

In FIG. 7, communication network 702, communication network 704, and mobile database 770 are operatively coupled to and in communication with MNS 730 through a communication network, and security module 794 is operatively coupled to and in communication with MNS 730 through a suitable communication network. In an example and referring to FIG. 1, communication network 702, communication network 704, and mobile database 770 function in substantially similar manner to communication network 102, communication network 104, and mobile database 170 within system 100 respectively.

In some embodiments, mobile database 770 includes a plurality of mobile records. In these embodiments, the mobile records comprise mobile record data that includes notification message 771, agent response 774, agent biometric data (i.e., confirmed biometric data) 775, and mobile notification message 776, among others. Further to these embodiments, notification message 771 and mobile notification message 776 include a plurality of embedded notification records associated to the notification messages, such as, for example, impact, urgency, and response request. In an example, and referring to FIG. 6, notification message 771 is substantially similar to notification message 666 created by messaging module 692.

Examples of values for urgency embedded within notification message 771 and mobile notification message 776 include "URGENT" and "NOT-URGENT", among others.

Examples of values for impact embedded within notification message 771 and mobile notification message 776 include "POSITIVE" and "NEGATIVE", among others. Examples of agent biometric data 775 include biometrics obtained by sensors on a wearable device which uniquely identify the agent, such as, fingerprint, heart rate, pulse, voice, iris image, facial recognition, among others. In some embodiments, agent biometric data 775 is biometric data which uniquely identify an agent authorized to interact with MNS 730 and associated Wearable Notification Systems (WNS). In these embodiments, agent biometric data 775 includes biometric data, such as, for example fingerprint, heart rate, pulse, voice, iris image, facial recognition, among others.

In some embodiments, security module 794 is configured to retrieve notification message 771 from mobile database 770, create mobile notification message 776, and communicate with a WNS through communication network 704 to instruct the WNS to provide local biometric data within the WNS to the MNS. In these embodiments, security module 794 is configured to retrieve agent biometric data 775 from mobile database 770. Further to these embodiments, security module 794 is configured to compare agent biometric data 775 with the local biometric data, and communicate mobile notification message 776 to the WNS when security module 794 finds a match between agent biometric data 775 and the local biometric data.

In some embodiments, security module 794 is implemented as a set of computer instructions executed by one or more MNS processor units that run computer executable program instructions or related algorithms. Each MNS processor unit may be a component of computing devices such as, for example laptop computers, portable computers, tablets, PDAs, smartphones, cellular phones, and the like. Additional examples of these implementations include servers, authorized computing devices, desktop computers, and other type of processor-controlled device that may receive, process, transmit digital data, and the like. In an example, an MNS processor unit as described in FIG. 3 can be implemented within the aforementioned computing devices.

Figure 8:
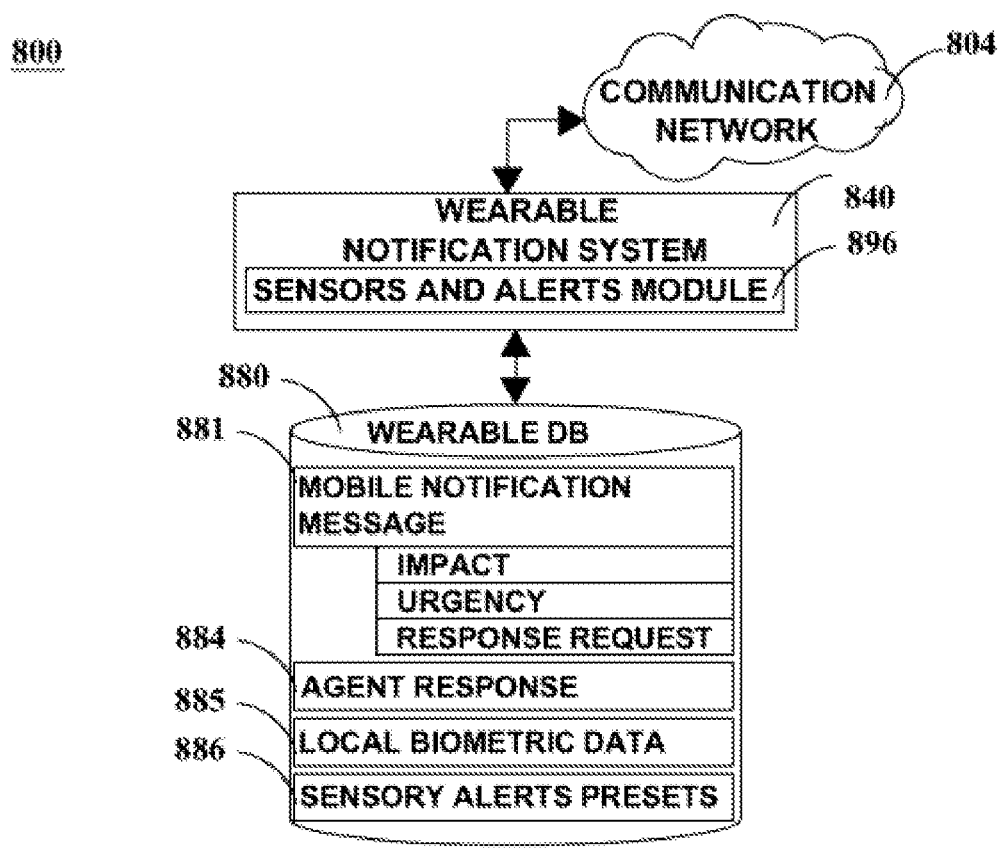
FIG. 8 is a block diagram of an exemplary subsystem of a sensors and alerts module within a wearable notification system (WNS), according to an embodiment.

FIG. 8 is a block diagram of an exemplary subsystem of a sensors and alerts module within a wearable notification system, according to an embodiment. In FIG. 8, subsystem 800 includes Wearable Notification System (WNS) 840, wearable database 880, and communication network 804. In FIG. 8, WNS 840 further includes sensors and alerts module 896. It should be understood that subsystem 800 can include less components, more components, or different components depending on the desired analysis goals and that the components may be arranged differently than illustrated in subsystem 800 of FIG. 8.

In FIG. 8, communication network 804, and wearable database 880 are operatively coupled to and in communication with WNS 840 through a communication network, and sensors and alerts module 896 is operatively coupled to and in communication with WNS 840 through a suitable communication network. In an example and referring to FIG. 1, communication network 804 and wearable database 880 function in substantially similar manner to communication network 104 and wearable database 180 within system 100 respectively.

In some embodiments, wearable database 880 includes a plurality of wearable records. In these embodiments, the wearable records comprise wearable record data that includes mobile notification message 881, agent response 884, local biometric data 885, and sensory alerts presets 886, among others.

Examples of values for urgency records embedded within mobile notification message 881 include "URGENT" and "NOT-URGENT", among others. Examples of values for impact embedded within mobile notification message 881 include "POSITIVE" and "NEGATIVE", among others. Examples of biometric data within local biometric data 885 include fingerprint, heart rate, pulse, iris image, facial recognition, and voice, among others.

In some embodiments, sensors and alerts module is configured to communicate with a Mobile Notification System (MNS) to receive a mobile notification message from the MNS. In these embodiments, sensors and alerts module 896 is configured to store the mobile notification message at mobile notification message 881 within wearable database 880.

In some embodiments, sensors and alert module 896 is configured to retrieve sensory alerts presets 886 from wearable database 880, and control vibration actuators, speakers, and LED/display devices within WNS 840 to execute a combination of vibrating pulses, sound alerts, and light alerts. In these embodiments, the combination of vibration pulses, sound, and light alerts corresponds to presets matching impact and urgency values embedded within mobile notification message 881.

In some embodiments, sensors and alerts module 896 controls a plurality of WNS position sensors within WNS 840, to determine a spatial position of WNS 840. Examples of WNS sensors include gesture sensors, gyroscopic sensors, accelerometers, and the like. In these embodiments, sensors and alerts module 896 waits for agent interaction, and displays infographics on WNS 840 when the agent moves WNS 840 to a position to view the display of WNS 840.

In some embodiments, the sensors and alerts module 896 is implemented as a set of computer instructions executed by one or more WNS processor units that run computer executable program instructions or related algorithms. Each WNS processor unit may be a component of wearable computing devices, such as, for example smartphones, tablets, smart bands (e.g., Fitbit®), smartwatches, smart glasses (e.g., Google Glass®), and the like. Additional examples of these implementations include servers, authorized computing devices, desktop computers, laptop computers, tablet computers, a PDAs, and other type of processor-controlled device that may receive, process, transmit digital data, and the like. In an example, a WNS processor unit as described in FIG. 4 can be implemented within the aforementioned computing devices.

In some embodiments, sensors and alerts modules 896 is configured to interact with one or more biometric sensors (not shown) of the WNS 840 that obtain local biometric data 885 of an agent wearing a wearable computing device. In some embodiments, sensors and alerts module 896 communicates with MNS 830 through communication network 804 and sends over local biometrics 885. Examples of biometric sensors that may be associated with wearable computing devices include voice sensors, fingerprint sensors, gesture sensors, iris scanners, heart rate sensors, among others. Examples of biometric data that may be sent to MNS 830 by sensors and alerts module 896 include fingerprint, heart rate, pulse, voice, iris image, facial recognition, among others.

Figure 9:
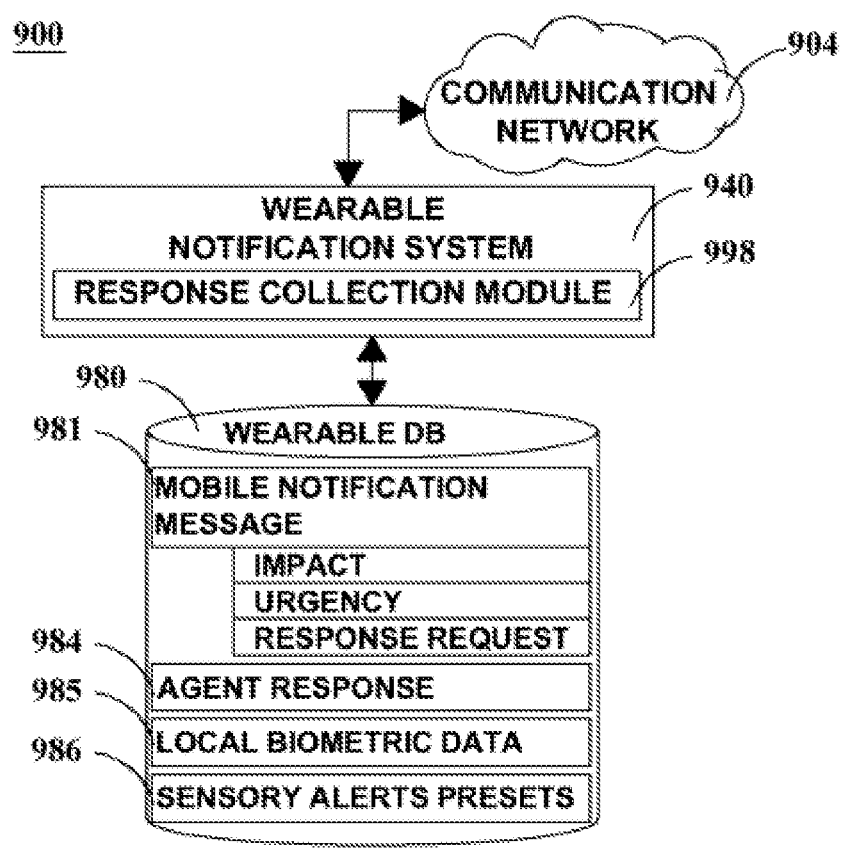
FIG. 9 is a block diagram of an exemplary subsystem of a response collection module within a wearable notification system (WNS), according to an embodiment.

FIG. 9 is a block diagram of an exemplary subsystem of a response collection module within a wearable notification system, according to an embodiment. In FIG. 9, subsystem 900 includes Wearable Notification System (WNS) 940, wearable database 980, and communication network 904. WNS 940 further includes response collection module 998. It should be understood that subsystem 900 can include less components, more components, or different components depending on the desired analysis goals and that the components may be arranged differently than illustrated in subsystem 900 of FIG. 9.

In FIG. 9, communication network 904 and wearable database 980 are operatively coupled to and in communication with WNS 940 through a communication network, and response collection module 998 is operatively coupled to and in communication with WNS 940 through a suitable communication network. In an example and referring to FIG. 1, communication network 904 and wearable database 980 function in substantially similar manner to communication network 104 and wearable database 180 within system 100 respectively.

In some embodiments, wearable database 980 includes a plurality of wearable records. In these embodiments, the wearable records comprise wearable record data that includes local biometric data 985, mobile notification message 981, agent response 984, and sensory alerts presets 986, among others. In these embodiments, mobile notification message 981 includes embedded notification records, such as, for example associated event impact, associated urgency, and associated response request (also herein called event impact record, notification urgency record, and response request record within the embedded notification record).

Examples of urgency values embedded within mobile notification message 981 include "URGENT" and "NOT-URGENT", among others. Examples of impact values embedded within mobile notification message 981 include "POSITIVE" and "NEGATIVE", among others. Examples of information within current biometric data 985 include fingerprint, heart rate, pulse, iris image, facial recognition, and voice, among others. Examples of local biometric data include biometrics obtained by sensors on the WNS, which uniquely identify a user currently wearing the WNS, such as fingerprint, heart rate, pulse, voice, iris image, facial recognition, among others.

In an embodiment, response collection module 998 is configured to extract the response request record from mobile notification message 981, and processes the response request record to create a response request form for display on WNS 940. In some embodiments, response collection module 998 is configured to retrieve mobile notification message 981 from wearable database 980, determine the type of response to be requested from the agent, and create a form on the user interface of WNS 940 to produce an agent response. In these embodiments, response collection module 998 is configured to create the form including a plurality of user interface controls, such as, for example a label control, a textbox control, and a button control. In other embodiments, additional user interface controls included within the form, such as, for example combo box controls, list controls, option controls, and the like.

In an example, the response collection module creates a web form on the user interface of WNS 940 that includes a label control, a textbox control, and a submit button control. In this example, response collection module 998 provides text to the label control informing the agent of the expected response, allows the agent to input text into the textbox control, and retrieves the text within the text box when the agent submits the response by clicking/hitting/touching the submit button control displayed on the user interface of WNS 940. Examples of text strings, data type, and the corresponding user interface controls included within the form are further described in FIG. 17, below.

In some embodiments, response collection module 998 is configured to store the agent response at agent response 984 within wearable database 980 and communicate agent response 984 to a Mobile Notification System (MNS) through communication network 904. In these embodiments, the MNS stores the received agent response at an agent record within a mobile database. Further to these embodiments, the MNS communicates the agent response record within the mobile database to a Notification Management System (NMS) through a communication network. In these embodiments, the NMS stores the agent response received from the MNS at an agent response record within a notifications database from which other systems can retrieve the agent response for further use.

In some embodiments, the response collection module 998 is implemented as a set of computer instructions executed by one or more WNS processor units that run computer executable program instructions or related algorithms. Each WNS processor unit may be a component of computing devices such as smartphones, tablets, smart bands (e.g., Fitbit®), smartwatches, smart glasses (e.g., Google Glass®), and the like. Additional examples of these implementations include servers, authorized computing devices, desktop computers, laptop computers, tablet computers, PDAs, and other type of processor-controlled device that may receive, process, transmit digital data, and the like. In an example, a WNS processor unit as described in FIG. 4 can be implemented within the aforementioned computing devices.

Process Flowchart for Notification Management System

In some embodiments, one or more computing devices perform a plurality of processes that are part of a system for managing notifications of events relevant to users. While the blocks in the disclosed processes are shown in a particular order, the actual order may differ. In some embodiments, some steps may be performed in parallel.

Figure 10:
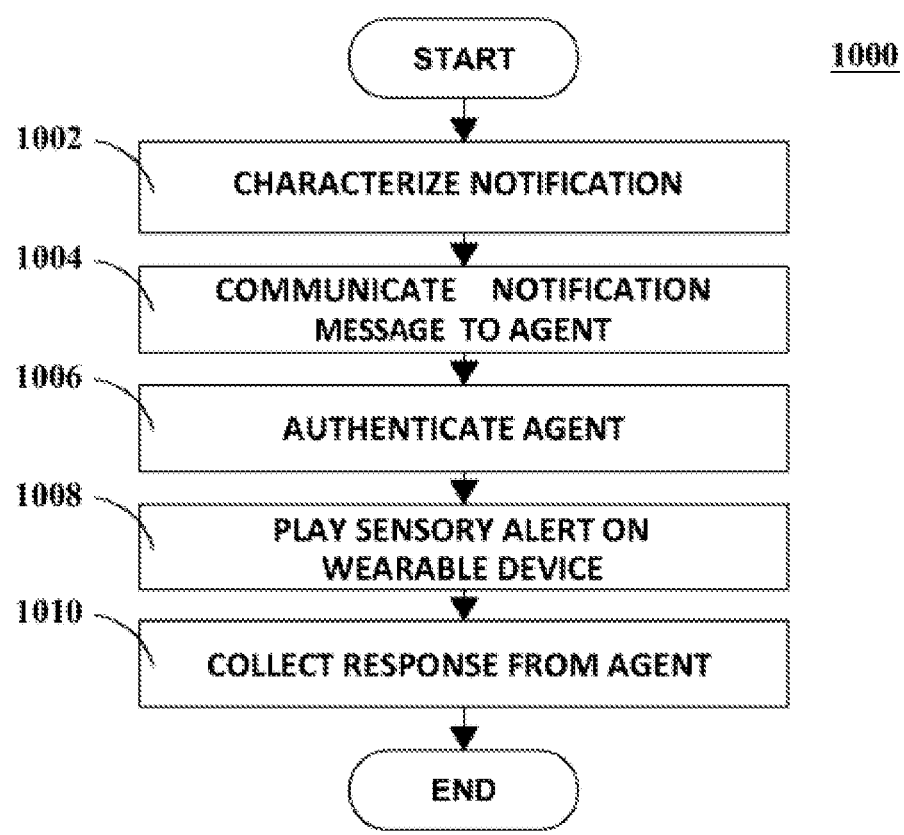
FIG. 10 is a flowchart of an exemplary method for notifying relevant events to users, according to an embodiment.

FIG. 10 is a flowchart of an exemplary method for notifying relevant events to users, according to an embodiment. Said method may be executed within system hardware and software architectures as described in FIGS. 1 to 9, above.

In FIG. 10, the method 1000 starts at step 1002. At step 1002, method 1000 characterizes notifications. In some embodiments, a Notification Management System (NMS) loads a characterization module from NMS memory into an NMS processor, which causes the NMS processor to perform processes described herein.

In some embodiments, the characterization module instructs the NMS processor to retrieve event details, associated customer, associated agent, and response request from an events database. In these embodiments, the characterization module instructs the NMS processor to determine the event impact, create an associated notification identifier, create an associated notification description, and determine the notification urgency. Further to these embodiments, the characterization module instructs the NMS processor to store an event identifier, event impact, notification identifier, notification description, and notification urgency within a notification database.

In an example, the characterization module instructs the NMS processor to determine the event impact and notification urgency by employing fuzzy logic algorithms on the event details. In an additional example, the characterization module determines the event impact and notification urgency by utilizing statistical analysis techniques on event details and notifications descriptions. In a further example, characterization module utilizes Naïve Bayes Filtering to determine the probability of events and notifications being of a determined impact and urgency respectively. In yet other embodiments, the characterization module instructs the NMS processor to interact with authorized users to allow the authorized users to manually set the event impact and notification urgency values. In various embodiments, the authorized users are employees of an company.

Figure 11:
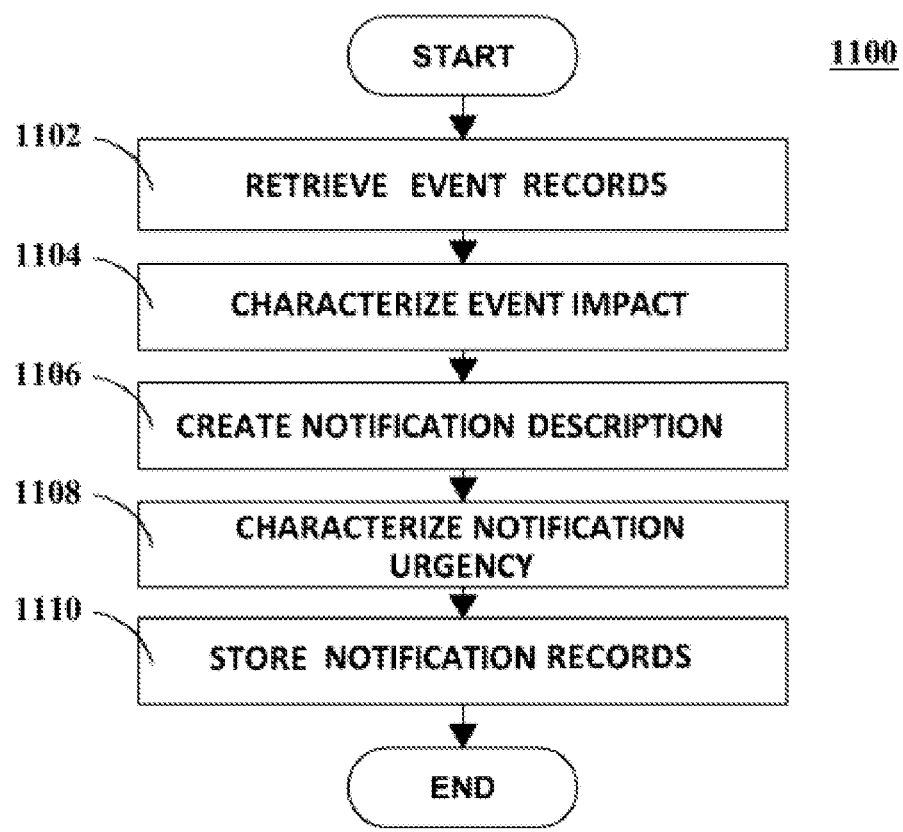
FIG. 11 is a flowchart of an exemplary method for characterizing notifications according to level of urgency and impact, according to an embodiment.

In an example, when events within the events database include a specific client approval, a specific paid premium, and a specific successful submission of business, the characterization module instructs the NMS processor to set urgency to "URGENT" and impact to "POSITIVE." In another example, when events within the events database include any approval, any paid premium, or any successful submission of business, among others, the characterization module instructs the NMS processor to set urgency to "NOT-URGENT", and impact to "POSITIVE." In a further example, when events within the events database include delay in processing, incomplete information, failed attempt, and declined request, the characterization module instructs the NMS processor to set urgency to "NOT-URGENT" and impact to "NEGATIVE." In yet another example, when events within the events database includes action required, failure, any refusal, or rejection, the characterization module instructs the NMS processor to set urgency to "URGENT" and impact to "NEGATIVE." Step 1002 is further discussed in FIG. 11, below. Method 1000 then advances to step 1004.

At step 1004, method 1000 communicates notification messages to agents. In some embodiments, at step 1004, the NMS loads a messaging module from NMS memory into an NMS processor, which causes the NMS processor to perform processes described herein.

In some embodiments, the messaging module instructs the NMS processor to create a notification message and send the notification messages to a Mobile Notification System (MNS). In these embodiments, the messaging module instructs the NMS processor to retrieve a plurality of records from a notifications database. Examples of records retrieved by the NMS processor include impact, notification description, and urgency. Further to these embodiments, the messaging module instructs the NMS processor to create a notification message from the records and communicate the notification message to the MNS through a communication network. Examples of notification message formats created by the NMS processor include email, MMS, voice mail, and the like. Step 1004 is further discussed in FIG. 12, below. Step 1004 is further discussed in FIG. 12, below. Method 1000 then advances to step 1006.

At step 1006, method 1000 authenticates agents. In some embodiments, a Mobile Notification System (MNS) loads a security module from MNS memory into an MNS processor, which causes the MNS processor to perform processes described herein.

In some embodiments, the security module instructs the MNS processor to determine when an authorized agent is currently wearing a wearable device including a Wearable Notification System (WNS). In these embodiments, the security module instructs the MNS processor to retrieve a notification message from a mobile database and create a mobile notification message based on the retrieved notification message and embed within the mobile notification message the associated urgency, associated impact, and associated response request records. Further to these embodiments, the security module instructs the MNS processor to communicate with the WNS through a communication network to retrieve the local biometric data from the WNS.

In some embodiments, a plurality of WNS sensors within the WNS determine the local biometric data. In these embodiments, the security module instructs the MNS processor to retrieve agent biometric data from a mobile database. Further to these embodiments, the security module instructs the MNS processor to compare the agent biometric data with the local biometric data, and communicate the mobile notification message to the WNS when the MNS processor determines there is a match between the agent biometric data and the local biometric data.

Step 1006 is further discussed in FIG. 13, below. Method 1000 then advances to step 1008.

At step 1008, method 1000 change a functional behavior on a wearable device by activating and executing sensory alerts on a wearable device including a WNS. In some embodiments, at step 1008, a WNS loads a sensors and alerts module from WNS memory into a WNS processor, which causes the WNS processor to perform processes described herein.

In these embodiments, the sensors and alerts module instructs the WNS processor to communicate with a MNS to receive a mobile notification message through short-range communication networks. Examples of short-range communication networks that the WNS processor uses to communicate include infrared communications, Bluetooth, ZigBee, and the like. In other embodiments, the sensors and alerts module instructs the WNS processor to communicate with the MNS through mid-range and long-range communication networks. Examples of mid-range and long-range communications networks include Wi-Fi, WiMAX, GPRS, the Internet, and the like.

Examples of information and values for urgency embedded within the mobile notification message received from the MNS processor include "URGENT" and "NOT-URGENT", among others. Examples of information and values for impact embedded within the mobile notification message sent by the MNS processor include "POSITIVE" and "NEGATIVE", among others.

Examples of information within agent biometric data sent to the MNS from the WNS processor include fingerprint, heart rate, pulse, voice, iris image, facial recognition, among others.

In some embodiments, the sensors and alerts module instructs the WNS processor to extract impact and urgency values from the mobile notification message received from the MNS. In these embodiments, the sensors and alerts module instructs the WNS processor to control vibration actuators, speakers, and LED/display devices within the WNS to play sensory alerts on the WNS upon matching the extracted impact and urgency values to sensory alerts presets. Further to these embodiments, the sensors and alerts module instructs the WNS processor to wait for agent interaction, and display infographics on the wearable device when the agent moves the WNS to a position to view the display of the WNS. Step 1008 is further discussed in FIG. 14, below. Method 1000 then advances to step 1010.

At step 1010, method 1000 collects agent responses to notification messages. In some embodiments, at step 1010, a Wearable Notification System (WNS) loads a response collection module from WNS memory into a WNS processor, which causes the WNS processor to perform processes described herein.

In some embodiments, the response collection module instructs the WNS processor to retrieve a mobile notification message from a wearable database, extract a response request record from the mobile notification message, and creates a form to request a response from the agent, based on the extracted response request record. In these embodiments, the response collection module presents the form to the agent, collects an agent response, and communicates the agent response to a Mobile Notification System (MNS).

In some embodiments, the response collection module instructs the WNS processor to retrieve a notification message from a wearable database, and extract a response request record from the mobile notification message. In these embodiments, the response collection module instructs the WNS processor to determine a text string to display and a data type request from the agent, based on the response request record and create a form based on the text string and the data type request. Further to these embodiments, the response collection module instructs the WNS processor to display the form on the user interface of the WNS to collect an agent response. In an example, the WNS processor creates an input box on the user interface of the WNS to produce a response from the agent.

In some embodiments, the response collection module instructs the WNS processor to collect the agent response from the displayed form, store the agent response at an agent record within the wearable database, and communicate with the MNS to send the agent response record to the MNS. In some embodiments, the sensors and alerts module instructs the WNS processor to communicate with the MNS through short-range communication networks. Examples of short-range communication networks include Bluetooth, ZigBee, infrared communications, and the like. In other embodiments, the sensors and alerts module instructs the WNS processor to communicate with the MNS through mid-range and long-range communication networks. Example of mid-range and long-range communications networks include Wi-Fi, WiMAX, GPRS, the Internet, and the like.

In some embodiments, the MNS stores the agent response at an agent response record within a mobile database. In these embodiments, the MNS communicates the agent response record within the mobile database to a NMS through a communication network. Further to these embodiments, the NMS stores the agent response received from the MNS at an agent response record within a notifications database. Step 1010 is further discussed in FIG. 15, below. Method 1000 ends.

By executing method 1000 using the exemplary operating environments described in FIGS. 1-9, efficiencies are created by providing companies with methods to automatically notify relevant events to users; alert the users about incoming notifications and collect responses from the users when the originating events require a response from the users. Automated notifications, notification alerts, and response collections allow companies to perform large amounts of work in large data sets in an efficient manner while avoiding time-consuming analysis that comes from manual work performed only by humans.

The processes described herein may be executed employing one or more computing devices, running associated software, of the system described in FIGS. 1-9. The process allows the associated applications of the Notification Management System, the Mobile Notification System, and the Wearable Notification System to quickly process large data sets. The Notification Management System, the Mobile Notification System, and the Wearable Notification System allow an company to provide notice of relevant events to users with minimum distraction and in a timely manner. The Notification Management System, the Mobile Notification System, and the Wearable Notification System further allow the users to respond in a timely manner using an automated more efficient method than is currently possible employing human-intervention data-driven analysis. In this way, efficiencies are created by providing the carrier with ways to improve productivity and create more favorable customer relationships.

FIG. 11 is a flowchart of an exemplary method for characterizing notifications according to level of urgency and impact, according to an embodiment. Said method may be executed in system hardware and software architectures as described in FIGS. 1-9. In these embodiments, a Notification Management System (NMS) loads an employee aggregation module from NMS memory into an NMS processor, which causes the NMS processor to perform processes described herein. In an example and referring to FIG. 10, method 1100 implements the programmatic logic and/or rules associated with step 1002 in method 1000, above.

Method 1100 starts at step 1102. In some embodiments, the characterization module instructs the NMS processor to retrieve an event records from an events database. In one embodiment, the event database comprises of uncategorized event records. The event record retrieved by the NMS processor from the events database in response to the instruction from the characterization module is uncategorized event record. In these embodiments, the characterization module instructs the NMS processor to retrieve events details, associated customer, associated agent, and response request from an events database. Method 1100 then advances to step 1104.

At step 1104, the characterization module instructs the NMS processor to characterize the event impact. In some embodiments, the characterization module instructs the NMS processor to set event impact value to "POSITIVE" or "NEGATIVE", among others. In these embodiments, the NMS processor sets the event to "POSITIVE" when events include any approval, paid premium, successful submission of business, specific client approval, specific paid premium, specific successful submission of business, and the like. Further to these embodiments, the NMS processor sets the event to "NEGATIVE" when events include any delay in processing, incomplete information, failed attempt in processing a request, declined request, action required, failure in processing a request, refusal to process a request, rejection of request, and the like. In some embodiments, the characterization module instructs the NMS processor to set a plurality of numbers as the determined event impact.

In some embodiments, the characterization module instructs the NMS processor to determine the event impact by utilizing fuzzy logic algorithms on the event details. In other embodiments, the characterization module instructs the NMS processor to determine the event impact by utilizing statistical analysis techniques on events details. In an example, the characterization module instructs the NMS processor to utilize Naïve Bayes Filtering to determine the probability of events being of a determined impact. In other embodiments, the characterization module instructs the NMS processor to interact with users to allow users to set the event's impact. Method 1100 then advances to step 1106.

At step 1106, the characterization module instructs the NMS processor to create a notification description. In some embodiments, the characterization module instructs the NMS processor to create a notification description record within the notifications database. In some embodiments, the characterization module instructs the NMS processor to create the notification description record based on the events details, associated customer, associated agent, and response request records retrieved from the events database at step 1102. Method 1100 then advances to step 1108.

At step 1108, the characterization module instructs the NMS processor to characterize a notification urgency. In these embodiments, the characterization module instructs the NMS processor to determine the notification urgency as either "URGENT" or "NOT-URGENT." In other embodiments, the characterization module instructs the NMS processor to set a plurality of numbers as the determined notification urgency.

In some embodiments, the characterization module instructs the NMS processor to set the urgency value to "URGENT" when events include specific client approval, specific paid premium, specific successful submission of business, action required, failure in processing a request, refusal to process a request, rejection of request, and the like. In these embodiments, the characterization module instructs the NMS processor to set the urgency value to "NOT-URGENT" when event notifications include any approval, any paid premium, any successful submission of business, delay in processing, incomplete information, failed attempt at processing a request, declined request, and the like.

In some embodiments, the characterization module instructs the NMS processor to determine the notification urgency by utilizing statistical analysis techniques on events details and notifications descriptions. In these embodiments, the characterization module instructs the NMS processor to utilize Naïve Bayes Filtering to determine the probability of notifications having a determined impact. Further to these embodiments, the characterization module instructs the NMS processor to interact with users to allow the users to set the notification urgency. Method 1100 then advances to step 1110.

At step 1110, the characterization module generates an instruction that instructs the NMS processor to store notification records. In some embodiments, the characterization module instructs the NMS processor to store records produced at steps 1104, 1106, and 1108 within the notification database. Notification records stored by the NMS processor within the notification database include event impact, notification description, and notification urgency, among others. In these embodiments, the NMS processor stores additional notification records, such as, for example event identifier and notification identifier within the notifications database. Method 1100 ends.

Figure 12:
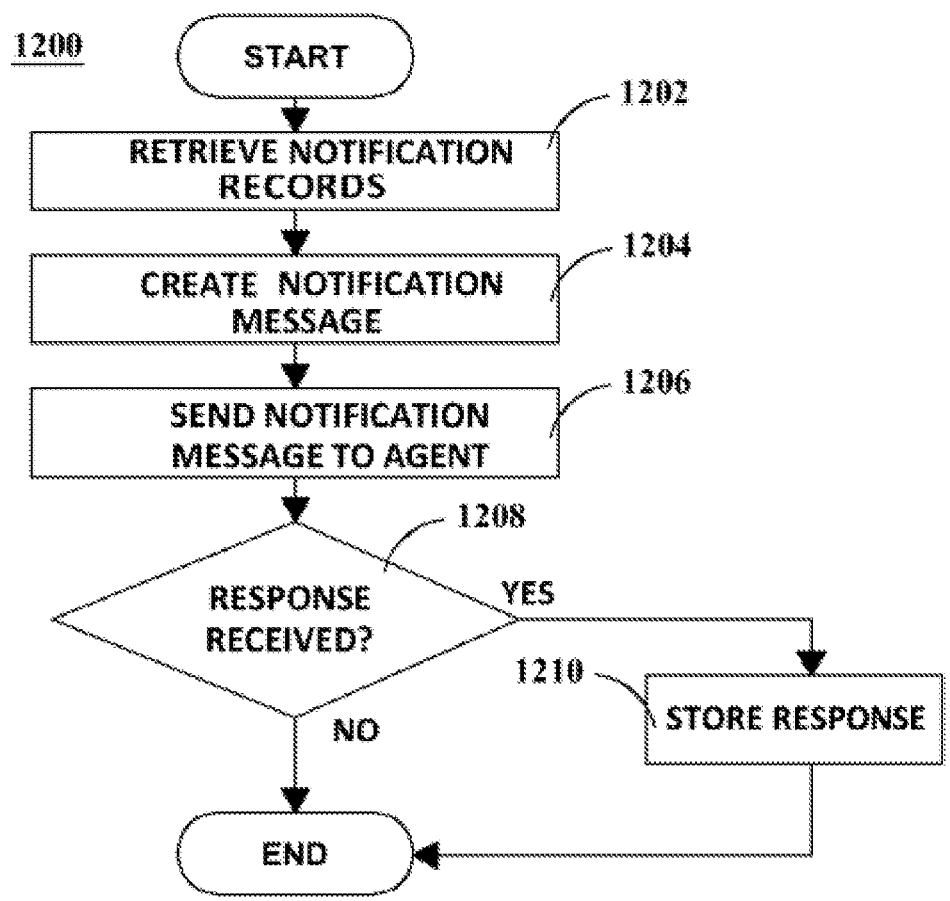
FIG. 12 is a flowchart of an exemplary method for communicating notification messages to users, according to an embodiment.

FIG. 12 is a flowchart of an exemplary method for communicating notification messages to users, according to an embodiment. In some embodiments, this method may be executed within a system including hardware and software architectures as described in FIGS. 1-9. In these embodiments, a Notification Management System (NMS) processor loads a messaging module from NMS memory into an NMS processor, which causes the NMS processor to perform processes described herein. In an example and referring to FIG. 10, method 1200 implements the programmatic logic and/or rules associated with step 1004 of method 1000.

Method 1200 begins at step 1202. At step 1202, the messaging module instructs the NMS processor to retrieve a notification records from a notification database. In some embodiments, the messaging module instructs the NMS processor to retrieve notification records from a notifications database, such as, for example the notification records stored in the notification database at step 1110 of Method 1100 of FIG. 11. In an example, the messaging module instructs the NMS processor to retrieve notification records, such as, notification description, response request, associated impact, and associated urgency from the notification database. Method 1200 continues to step 1204.

At step 1204, the messaging module instructs the NMS processor to create a notification message. In some embodiments, the messaging module instructs the NMS processor to create the notification message based on information within the notification records retrieved from the notifications database at step 1202. In these embodiments, the messaging module includes information from the characterized notification within the notification message. Examples of information embedded within the create notification message include event impact, notification urgency, and response request information, among others. Method 1200 then advances to step 1206.

At step 1206, the messaging module instructs the NMS processor to send the notification message to an agent. In some embodiments, the messaging module instructs the NMS processor to send a signal to a Mobile Notification System (MNS) to send the notification message, created by the NMS at step 1204, to the MNS. In these embodiments, the MNS stores the received notification message at a notification message records within a mobile database. Examples of notification messages sent by the NMS processor to the MNS include email, MMS, voice mail, and the like. Method 1200 then advances to step 1208.

At step 1208, the messaging module instructs the NMS processor to check for responses received from the MNS. If the NMS receives a response from the MNS, method 1200 advances to step 1210. If the NMS does not receive a response from the MNS, method 1200 ends.

At step 1210, the messaging module instructs the NMS processor to store the received response. In some embodiments, the messaging module instructs the NMS processor to store the received response at an agent response record within the notifications database. In these embodiments, the received response is an agent response received by the MNS and collected by a WNS by interacting with an authorized agent using a wearable device including the WNS. Method 1200 ends.

Figure 13:
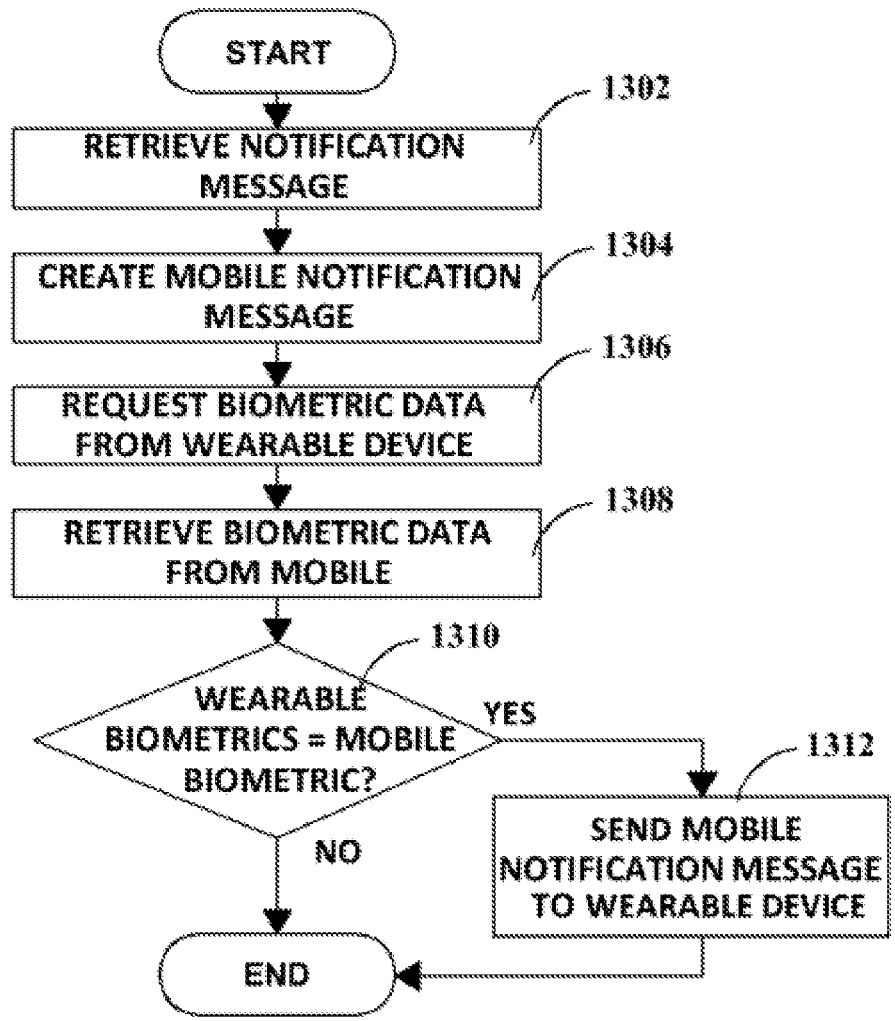
FIG. 13 is a flowchart of an exemplary method for determining if a wearable computing device is authorized to receive a notification message, according to an embodiment.

FIG. 13 is a flowchart of an exemplary method for determining if a wearable computing device including a wearable notification system is authorized to receive a notification message, according to an embodiment. Said method may be executed within a system including hardware and software architectures as described in FIGS. 1-9. In these embodiments, a Mobile Notification System (MNS) processor loads a security module from MNS memory into an MNS processor, which causes the MNS processor to perform processes described herein. In some embodiments, the security module instructs the MNS processor to execute code that determines if an agent currently wearing a computing device including a Wearable Notification System (WNS) is authorized to receive a notification message. In some embodiments, the security module instructs the MNS processor to execute Method 1300 for every notification message sent to the WNS. In other embodiments, a security module within the WNS instructs a WNS processor to execute method 1300 each time a person wears a wearable computing device including the WNS, and deactivates the WNS whenever an unauthorized user is using the wearable computing device. In an example and referring to FIG. 10, method 1300 is implemented as step 1006 in method 1000.

Method 1300 begins at step 1302. In some embodiments, the security module instructs the MNS processor to retrieve a notification message from a mobile database. In these embodiments, the notification message retrieved by the MNS processor includes embedded notification records, such as, for example impact, urgency, and response requested, among others. In an example, and referring to FIG. 12, the notification message stored within the mobile database is substantially similar to the notification message sent from a NMS to an MNS as detailed at step 1206. Method 1300 then advances to step 1304.

At step 1304, the security module instructs the MNS processor to create a mobile notification message. In some embodiments, the security module instructs the MNS processor to create a mobile notification message based on a notification message, such as for example the notification message retrieved by the security module at step 1302. In these embodiments, the security module instructs the MNS processor to extract impact, urgency and response request values embedded within the notification message and create a mobile notification message based on the notification message and extracted notification records. Further to these embodiments, the security module instructs the MNS processor to embed within the mobile notification message, the extracted impact, urgency, and response request records.

In some embodiments, the security module instructs the MNS processor to store the mobile notification message within the mobile database. In these embodiments, the mobile notification message created by the MNS processor is substantially similar to the notification message retrieved by MNS processor at step 1302. Method 1300 then advances to step 1306.

At step 1306, the security module instructs the MNS processor to request local biometric data from a WNS. In some embodiments, the security module instructs the MNS processor to send a signal to WNS through a communication network to request the WNS to provide local biometric data to the MNS.

In some embodiments, a sensors and alerts module within the WNS retrieves the local biometric data from a wearable database. In other embodiments, the sensors and alerts module retrieves the local biometric data from a plurality of WNS sensors within the WNS, which determine the local biometric data. In an example and referring to FIGS. 4 and 7, a WNS such as WNS 440 retrieves local pulse rate biometric data from sensors 449 and communicates the retrieved pulse rate biometric data to MNS 730, over communication network 404 in response to the MNS requesting the local biometric data within the WNS. Additional examples of biometric data requested by the MNS processor include fingerprint, heart rate, voice, iris image, facial recognition, among others. Method 1300 then advances to step 1308.

At step 1308, the security module instructs the MNS processor to retrieve agent biometric data (i.e., confirmed biometric data) from a mobile database. In these embodiments, the security module instructs the MNS processor to retrieve agent biometric data from the mobile database. Examples of agent biometric data retrieved by the MNS processor from the mobile database include fingerprint, heart rate, pulse, voice, iris image, facial recognition, among others. In some embodiments, the agent biometric data retrieved from the mobile database includes biometric data associated to an authorized agent and registered in the mobile database as a security measure to avoid sending notification messages to people other than the authorized agent. Method 1300 then advances to step 1310.

At step 1310, the security module instructs the MNS processor to check for a match between the agent biometric data and the local biometric data. If the agent biometric data and the local biometric data match, method 1300 then advances to step 1312.

At step 1312, the security module instructs the MNS processor to send a mobile notification message to the wearable device including the WNS. In some embodiments, the security module instructs the MNS processor to send a signal to the WNS to send the mobile notification message created by the MNS processor at step 1304. Examples of mobile notification messages created and sent by the security module to the WNS include email, MMS, voice mail, and the like. Method 1300 ends.

Figure 14:
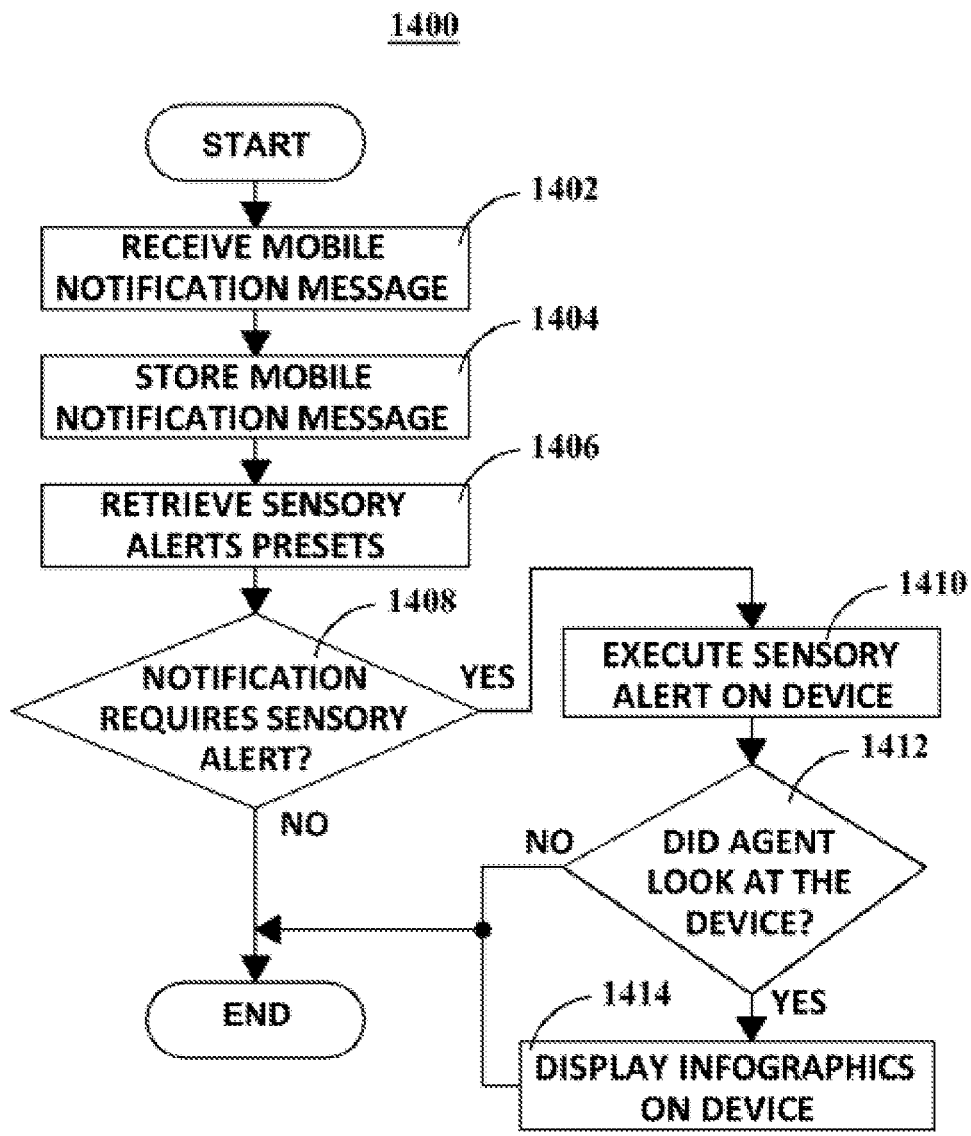
FIG. 14 is a flowchart of an exemplary method for alerting an authorized user of relevant incoming notification messages, according to an embodiment.

FIG. 14 is a flowchart of an exemplary method for alerting an authorized agent of relevant notification messages, according to an embodiment. Said method may be executed within a system including hardware and software architectures as described in FIGS. 1-9. In these embodiments, a Wearable Notification System (WNS) processor loads a sensors and alerts module from WNS memory into a WNS processor, which causes the WNS processor to perform processes described herein. In some embodiments, the sensors and alerts module instructs the WNS processor to execute code that alerts an agent of relevant notification messages. In an example and referring to FIG. 10, method 1400 implements the programmatic logic and/or rules associated with step 1008 in method 1000.

Method 1400 begins at step 1402. In some embodiments, the sensors and alerts module instructs the WNS processor to receive a mobile notification message. In these embodiments, the sensors and alerts module instructs the WNS processor to communicate with a Mobile Notification System (MNS), and receive a mobile notification message including embedded notification records from the MNS. Examples of notification records embedded within the mobile notification message and received from the MNS include impact, and urgency. In an example and referring to FIG. 1, a MNS such as MNS 130 sends a signal to a WNS such as WNS 140 to send a mobile communication message from MNS 130 to WNS 140.

In some embodiments, the MNS initiates the request to have the WNS receive the notification message. In these embodiments, the MNS performs a security check, such as the security check detailed in Method 1200, before sending the notification message to the WNS to avoid sending notification messages to a wearable computing device worn by people other than an authorized agent.

In some embodiments, the WNS performs a security check substantially similar to the security check detailed in method 1200 to avoid displaying notification messages on a wearable computing device worn by people other than the authorized agent. Method 1400 then advances to step 1404.

At step 1404, the sensors and alerts module instructs the WNS processor to store the mobile notification message. In some embodiments, the sensors and alerts module instructs the WNS processor to store the mobile notification message along with impact and urgency records in a wearable database. Method 1400 then advances to step 1406.

At step 1406, the sensors and alerts module instructs the WNS processor to retrieve sensory alerts presets from the wearable database. In some embodiments, the sensors and alerts modules instructs the WNS processor to extract impact and urgency values from the records within the mobile notification message. Further to these embodiments, the sensors and alerts module instructs the WNS processor to retrieve a plurality of sensory alerts presets from a wearable database. In these embodiments, sensory alerts presets are a collection of available orthogonal triple redundant sensory alerts with alerting an agent to a notification message. Examples of sensory alerts presets include presets for the repeat rate and intensity of vibrating pulses, repeat rate and pitch of beeps of sound, and repeat rate and color of blinks of light, that an associated wearable device executes based on the received urgency and impact records. Method 1400 then advances to step 1408.

At step 1408, the sensors and alerts module instructs the WNS processor to check if the incoming notification message requires sensory alerts. In some embodiments, if the WNS processor checks whether the impact and urgency values extracted from the mobile notification message matches any of the sensory alert preset retrieved from the wearable database at step 1406. If the impact and urgency values have matching sensory alerts presets, method 1400 advances to step 1410. If the impact and urgency values do not have matching alerts presets, method 1400 ends.

At step 1410, when the impact and urgency values have matching sensory alerts presets, the WNS processor of the wearable device modifies the functional behavior of the wearable device. In an embodiment, the sensors and alerts module instructs the WNS processor to execute sensory alerts on the WNS device.

In some embodiments, the sensors and alerts module instructs the WNS processor to control vibration actuators, sound actuators, and LED/display actuators to execute a combination of vibrating pulses, sound alerts, and light alerts on the WNS device. An example of sensory alerts executed by the WNS processor include two beeps per second of low-pitch audible sound, two vibrating pulses per second, and one green light blink per second for urgent and positive alerts. Another example of sensory alerts executed by the WNS processor include one beep per second of low-pitch sound, one vibrating pulse per second, and one green light blink per second for negative and non-urgent alerts. A further example of sensory alerts executed by the WNS processor include one beep per second of high-pitch audible sound, one vibrating pulse per second, and one red light blink per second for negative non-urgent alerts. Yet another example of sensory alerts executed by the WNS processor include two beeps per second of high-pitch sound, two vibrating pulses per second, and two red light blinks per second for negative and urgent alerts. In an example and referring to FIG. 4, the sensors and alerts module instructs WNS processor 445 to control a plurality of devices within I/O 446, such as, for example vibration actuator 446, speaker 447, and LED/display 448 to execute a combination of vibrating pulses, sound, and light alerts on WNS 440. In these embodiments, the WNS processor controls the I/O devices to execute the vibrating pulses, sound alerts, and light alerts at the same time, consecutive to one another, or at different times. Method 1400 then advances to step 1412.

At step 1412, the sensors and alerts module instructs the WNS processor to check if the user moved the wearable device into a position to view the WNS display. In some embodiments, the WNS processor interacts with WNS sensors included in the WNS, including gesture sensors, gyroscopic sensors, accelerometers, and the like, to obtain position data for the WNS. If the WNS processor determines the used moved the WNS to view the display of the WNS, method 1400 then advances to step 1414. In an example and referring to FIG. 4, a WNS processor 445 instructs WNS sensors 450 to provide gyroscope data, gesture sensors data, and accelerometer data, among others. Further to this example WNS processor 445 determine a position of WNS 440 based on the data provided by WNS sensors 450.

At step 1414, the sensors and alerts module instructs the WNS processor to display infographics on the display of the WNS. In some embodiments, the sensors and alerts module instructs the WNS processor to display infographics including icons on the WNS display, which allow the agent to easily recognize notification messages and associated response request from the message without having the agent read the content of the message. Method 1400 ends.

Figure 15:
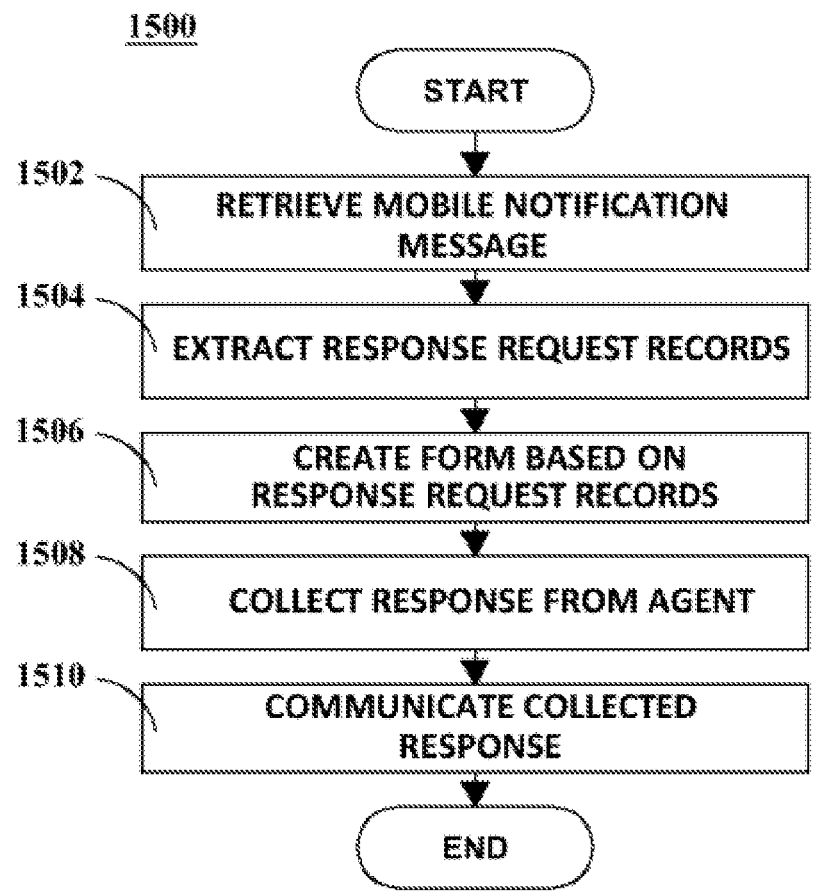
FIG. 15 is a flowchart of an exemplary method for collecting responses to notification messages from authorized users, according to an embodiment.

FIG. 15 is a flowchart of an exemplary method for collecting responses to notification messages from authorized users, according to an embodiment. This method may be executed within a system including hardware and software architectures as described in FIGS. 1-9. In these embodiments, a Wearable Notification System (WNS) processor loads a response collection module from WNS memory into a WNS processor, which causes the WNS processor to perform processes described herein. Further to these embodiments, the WNS executes a security check, such as, for example the security check detailed in Method 1200, to avoid interacting with people other than an agent authorized to receive mobile notification messages. In an example and referring to FIG. 10, method 1500 implements the programmatic logic and/or rules associated with step 1010 in method 1000.

Method 1500 begins at step 1502. At step 1502, the response collection module instructs the WNS processor to retrieve a notification message. In some embodiments, the response collection module instructs the WNS processor to retrieve a mobile notification message from a wearable database. In these embodiments, the mobile notification message includes embedded notification records, such as, for example impact, urgency, and response request records, among others. In these embodiments, the response request records include a text string to display and a data type to request from the agent. Method 1500 advances to step 1504.

At step 1504, the response collection module instructs the WNS processor to extract response request records. In some embodiments, the response collection module instructs the WNS processor to extract response request records embedded within the mobile notification message. In some embodiments, request response records include response request text strings and response request data types.

In some embodiments, the response request records included within the mobile notification message are part of the mobile notification message format, which the response collection module parses to extract the response request records. In an example, the response collection module instructs the WNS processor to determine response request records values from headers within a mobile notification message in email format compliant with RFC 2047, 4021, and the like. Examples of text strings values includes "NEW BUSINESS SUCCESSFULLY SUBMITTED", and "PLEASE PROVIDE D.O.B FOR CASE 9991", among others. Examples of data type values associated to the exemplary text strings include "NULL" and "DATETIME" among others. Additional examples of text strings values, and data types values determined by the response collection module and embedded within a mobile notification message are further described in FIG. 17, below. Method 1500 then advances to step 1506.

At step 1506, the response collection module instructs the WNS processor to create a form based on response request records values. In some embodiments, the response collection module instructs the WNS processor to create a form based on the text string and the data type values.

In some embodiments, the response collection module instructs the WNS processor to include the text string value within a label in the form. In these embodiments, the response collection module instructs the WNS processor to include an input control within the form based on the data type value. In an example, the response collection module instructs the WNS processor to include a textbox control within the form when the data type value includes "DATE-TIME", "TEXT", "NUMBER", among others. In another example, the response collection module instructs the WNS processor to include a checkbox control within the form when the data type values includes "YES/NO", and "TRUE/FALSE."

In other embodiments, the mobile notification message includes additional embedded notification records, such as, for example notification date, event date, event type, customer type, product type, and the like. In these embodiments, the response collection module instructs the WNS processor to create a form based on the response request records values and the additional notification records values embedded within the mobile notification message. Method 1500 then advances to step 1508.

At step 1508, the response collection module instructs the WNS processor to collect a response from the authorized agent. In some embodiments, the response collection module instructs the WNS processor to display a form, such as the form created at step 1506, and collect a response from the agent. In these embodiments, the response collection module instructs the WNS processor to interact with the authorized agent by displaying a form on the user interface of a wearable computing device worn by the authorized agent. Further to these embodiments, the wearable computing device worn by the authorized agent includes the WNS. In an example, the response collection module displays an input box on the user interface of the wearable computing device to collect a text string response from the agent. Examples of responses requested from the agent includes text, numbers, and Boolean responses (e.g., "yes/no" or "TRUE/FALSE").

In some embodiments, the response collection module instructs the WNS processor to store the agent response at an agent response record within the wearable database after receiving a response from the agent interacting with the form displayed on the user interface of the WNS.

In some embodiments, responses executed by users are actions that do not require interaction with the form. Examples of actions that do not require the agent to interact with the form include retrieving customer records, calling an underwriter over the phone, calling a customer over the phone, scheduling customer visits, and following up on sales leads, among others.

In some embodiments, the response collection module utilizes voice recognition to receive input from the authorized agent. In an example, the authorized agent replies to a response request by speaking "NO" into a microphone within the WNS upon which the WNS acknowledges the "NO" as an answer to the response request. In another example, the authorized agent may dismiss a mobile notification message by speaking "DISMISS" into a microphone within the WNS upon which the WNS removes the notification from the WNS display. In a further example, the authorized agent calls the customer associated to the mobile notification message by speaking "CALL CUSTOMER JOHN DOE" into a microphone within the WNS upon which the WNS dials customer number "JOHN DOE" from the mobile device. In yet another example, an authorized agent establishes voice shortcuts, such as, for example "CLIENTJAN01" which enables the authorized agent to retrieve "JOHN DOE" contact records from the WNS, by speaking "CLIENTJAN01" into a microphone within the WNS.

In some embodiments, the response collection module collects responses from the authorized agent by analyzing gestures interpreted by WNS sensors on the WNS. In an example, the authorized agent dismisses a notification message by flipping the WNS to a position in which the authorized agent is not viewing the WNS display.

Method 1500 then advances to step 1510.

At step 1510, the response collection module instructs the WNS processor to communicate the agent response to a Mobile Notification System (MNS).

In some embodiments, the response collection module instructs the WNS processor to send a signal through to the MNS to send the agent response to the MNS. In some embodiments, the WNS utilizes short-range networks to send the signal to the MNS. In other embodiments, the WNS utilizes mid-range and long-range communication networks to send the signal to the MNS. Examples of short-range communication networks that the WNS processor utilizes to send the signal to the MNS include Bluetooth, ZigBee, infrared communications, and the like. Example of mid-range and long-range communications networks that the WNS processor utilizes to send the signal to the MNS include Wi-Fi, WiMAX, GPRS, the Internet, and the like.

In some embodiments, the MNS stores the agent response at an agent response record within a mobile database. In these embodiments, the MNS communicates the agent record within the mobile database to a Notification Management System (NMS). Further to these embodiments, the NMS stores the received agent response at an agent response record within a notifications database for further use.

FIG. 16 is a table of exemplary data including sensory alerts presets, according to an embodiment.

In FIG. 16, table 1600 includes AUDIBLE, VIBRATION, and VISUAL columns that include combinations of orthogonal triple redundant stimuli or sensory alerts, which a Wearable Notification System (WNS) executes to alert users about notification messages of varied impact and urgency. In some embodiments, the WNS interacts with users to set a plurality of profiles for the sensory alerts presets. In these embodiments, the WNS sets profiles for a plurality of types of situations the agent may be in and the preferred way in which the agent wants to be alerted in those situations, such as profiles for when the agent is in meetings, profiles for when the agent is driving, and profiles for specific times of the day, among others. The WNS may include a user interface that enables the agent to indicate when the agent is in a particular situation that may affect desired execution of sensory alerts (in the present disclosure, sometimes called "applicable agent situation"), e.g., in a meeting or driving.

In FIG. 16, examples of sensory alerts presets include presets for "URGENT NEGATIVE", "NEGATIVE", "URGENT POSITIVE" and "POSITIVE." As shown in FIG. 16, examples of sensory alerts presets for "URGENT POSITIVE" notification messages include two beeps per second of low-pitch audible sound, two vibrating pulses per second, and one green light blink per second. Additional examples for sensory alerts presets for "NEGATIVE" notification messages include one beep per second of low-pitch sound, one vibrating pulse per second, and one green light blink per second. Further example of sensory alerts presets for "NEGATIVE" notification messages include one beep per second of high-pitch audible sound, one vibrating pulse per second, and one red light blink per second. Yet another example of sensory alerts presets for "URGENT NEGATIVE" notification messages include two beeps per second of high-pitch sound, two vibrating pulses per second, and two red light blinks per second.

FIG. 17 is a table of exemplary data including text strings, response data type, input control type, and button type, according to an embodiment. In FIG. 17, table 1700 includes a response data type, an input control type, and a button type associated with each text string.

In some embodiments, each mobile notification message includes a response request that further includes text string values and data type values. In an example and referring to FIG. 15, response requests are extracted by a response collection module at step 1504 of Method 1500.

In some embodiments, text string values communicate a message to the agent and data type values identify the types of data the agent is requested to provide.

In these embodiments, input control type and button type values are examples of controls associated with the response data type and produced by a response collection module. In an example and referring to FIG. 15, response data type are produced by a response collection module at step 1506 of Method 1500. In the example, the response collection module produces a TEXTBOX for input control type and includes the TEXTBOX in the form when data type value is "DATETIME."

In another example, the response collection module includes an "OK" button control for dismissing or accepting a notification message when the response data type is "NULL", and includes a "SUBMIT" button type when the response data type value is "DATETIME."

Figure 18:
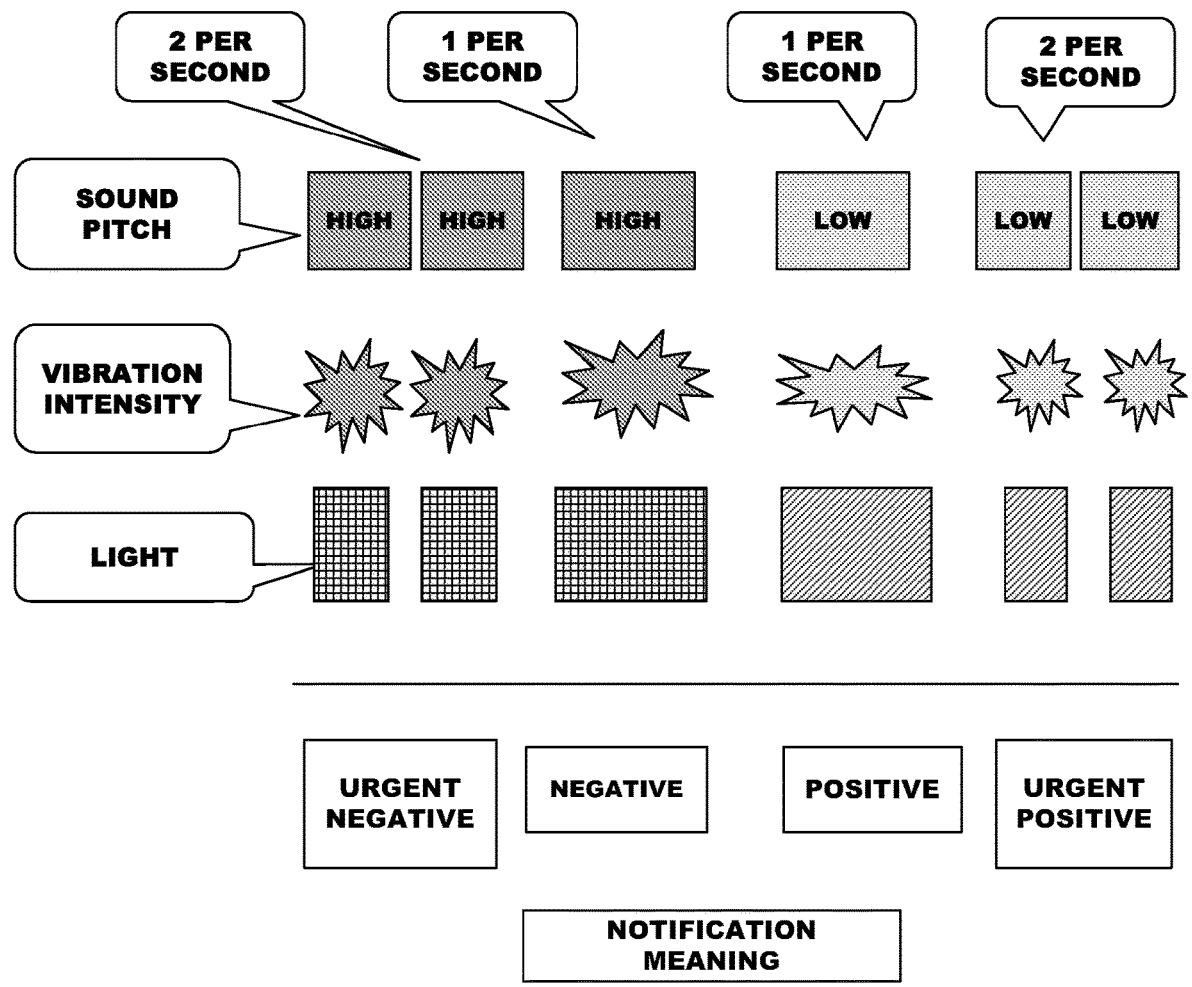
FIG. 18 is a schematic diagram of sensory alerts for characterized notification messages, according to an embodiment.

EXAMPLE: In an example of an agent notification system, FIG. 18 is a schematic diagram of sensory alerts based upon selected levels of sensory notification in characterized notification messages. Sensory alerts presets are established to create four options for notification meaning of sensory alerts: "URGENT NEGATIVE", "NEGATIVE", "URGENT POSITIVE" and "POSITIVE." Any other notifications are muted in the sensory alerts.

Upon receiving a specific notification message, the WNS executes appropriate sensory alerts. The sensory alerts arrangement illustrated in FIG. 18 includes various sensor alerts that are preset by the user (agent). In FIG. 18, the top row of alert symbols indicate the settings for audible alerts; the middle row indicates settings for vibration alerts; and the bottom row indicates settings for light alerts; in each case depending on the notification meaning below. (Visual alerts include red lights for urgent negative and negative notifications, and green lights for positive and urgent positive notifications). As part of the settings, the user may set preferences for the length of time for each alert/notification type to last. For example, a positive Audible alert could be set to last 2 seconds, Vibration alert to last 1 second, and Visual alert to last 5 seconds.

The sensory alerts executed depend upon which of the four options for notification meaning applies to a specific notification message:

For an urgent positive notification, the following alerts are executed:
  Audible: Rapid Interval Low Pitch Sound (2 beeps per second)
  Vibration: Rapid and Low Intensity Vibration (2 per second)
  Visual: Rapid Green Blinking Light (2 per second)

For a positive notification, the following alerts are executed:
  Audible: Low Pitch Sound (1 beep per second)
  Vibration: Low Intensity Vibration (1 per second)
  Visual: Green Quick Blinking Light (1 per second)

For a negative notification, the following alerts are executed:
  Audible: High Pitch Sound (1 per second)
  Vibration: High Intensity Vibration (1 per second)

Visual: Red Blinking Light (1 per second)

For an urgent negative notification, the following alerts are executed:

Audible: Rapid Interval High Pitch Sound (2 per second)
Vibration: Rapid High Intensity Vibration (2 per second)
Visual: Rapid Red Blinking Light (2 per second)

Following the execution of sensory alerts appropriate to the specific notification message, the WNS senses whether the user is looking at the wearable device. For example, smartwatch 110 may execute a vibratory sensory alert, and a position sensor may sense that the user has moved his wrist to look at the smartwatch. If the user elects to look at the smartwatch, the smartwatch displays an infographic icon appropriate to the notified event.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then", "next", etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A notification method comprising:
   receiving, by a first electronic device, an electronic event associated with a client, the electronic event having a notification description, a notification urgency value, an event impact value, and a response request comprising at least one interactive element;
   generating, by the first electronic device, a sensory alert notification corresponding to the electronic event, the sensory alert notification comprising at least one of a repeat and intensity rate of vibrating pulses, a repeat and a pitch rate of an audible alert, and a repeat rate and a color of a visual alert,
      wherein the first electronic device generates the sensory alert notification based on the event impact value and the notification urgency value by setting the vibrating pulse, audible alert, or visual alert according to a corresponding level of the event impact value and the notification urgency value; and
   outputting, by the first electronic device, the sensory alert notification,
      whereby when a user operating the first electronic device interacts with the interactive element of the response request, a second electronic device associated with the user establishes an electronic communication session with a third electronic device associated with the client.

2. The notification method of claim 1, wherein the electronic event is received from a server.

3. The notification method of claim 1, wherein the electronic event is received from the second electronic device.

4. The notification method of claim 1, further comprising:
   receiving, by the first electronic device, transmission of biometric data from a user operating the electronic device; and comparing, by the first electronic device, the received biometric data with confirmed biometric data associated with the user; and in response to the received biometric data matching the confirmed biometric data associated with the user, outputting, by the first electronic device, the sensory alert notification.

5. The notification method of claim 1, wherein the level of the event impact value and the notification urgency value comprises urgent negative, non-urgent negative, urgent positive, and non-urgent positive.

6. The notification method of claim 1, wherein the first electronic device is a smart watch, mobile device, cellular phone, or an electronic wearable device.

7. The notification method of claim 1, wherein the sensory alert notification further comprises a request for a response from a user operating the first electronic device.

8. The notification method of claim 7, further comprising:
receiving, by the first electronic device, a response from the user; and
storing, by the first electronic device, the response to the request in an event database.

9. The notification method of claim 1, wherein the at least one of the repeat and intensity rate of vibrating pulses, the repeat and the pitch rate of an audible alert, and the repeat rate and the color of an visual alert is outputted consecutive to one another.

10. The notification method of claim 1, wherein the first electronic device displays infographics regarding the electronic event when a sensor in communication with the first electronic device determines that a user moves the first electronic device.

11. An electronic notification computer system comprising:
a server configured to generate and transmit electronic events to one or more electronic devices, each electronic event associated with a client, each electronic event comprising a notification description, a notification urgency value, an event impact value and a response request comprising at least one interactive element; and
a first electronic device from the one or more electronic devices in communication with the server, the first electronic device configured to:
receive, from the server, an electronic event;
generate a sensory alert notification corresponding to the electronic event, the sensory alert notification comprising at least one of a repeat and intensity rate of vibrating pulses, a repeat and a pitch rate of an audible alert, and a repeat rate and a color of a visual alert,
wherein the first electronic device generates the sensory alert notification based on the event impact value and the notification urgency value by setting the vibrating pulse, audible alert, or visual alert according to a corresponding level of the event impact value and the notification urgency value; and
output the sensory alert notification,
whereby, when a user operating the first electronic device interacts with the interactive element of the response request, a second electronic device associated with the user establishes an electronic communication session with a third electronic device associated with the client.

12. The electronic notification computer system of claim 11, wherein the electronic event is received from the second electronic device.

13. The electronic notification computer system of claim 11, wherein the first electronic device is further configured to:
receive transmission of biometric data from a user operating the first electronic device; and
compare the received biometric data with confirmed biometric data associated with the user; and
in response to the received biometric data matching the confirmed biometric data associated with the user, output the sensory alert notification.

14. The electronic notification computer system of claim 11, wherein the level of the event impact value and the notification urgency value comprises urgent negative, non-urgent negative, urgent positive, and non-urgent positive.

15. The electronic notification computer system of claim 11, wherein the first electronic device is a smart watch, mobile device, cellular phone, or an electronic wearable device.

16. The electronic notification computer system of claim 11, wherein the sensory alert notification further comprises a request for a response from a user operating the first electronic device.

17. The electronic notification computer system of claim 16, wherein the first electronic device is further configured to:
receive a response from the user; and
store the response to the request in an event database.

18. The electronic notification computer system of claim 17, wherein the first electronic device outputs the sensory alert notification upon the response matching a predetermined response.

19. The electronic notification computer system of claim 11, wherein the at least one of the repeat and intensity rate of vibrating pulses, the repeat and the pitch rate of an audible alert, and the repeat rate and the color of an visual alert is outputted consecutive to one another.

20. The electronic notification computer system of claim 11, wherein the first electronic device displays infographics regarding the electronic event when a sensor in communication with the first electronic device determines that a user moves the first electronic device.

* * * * *